(12) United States Patent
Tirupattur Saravanan et al.

(10) Patent No.: US 10,949,434 B1
(45) Date of Patent: Mar. 16, 2021

(54) USER IDENTIFICATION SYSTEM

(71) Applicant: Facebook, Inc., Menlo Park, CA (US)

(72) Inventors: Sanjay Kanaka Sai Tirupattur Saravanan, Fremont, CA (US); Bradley H Smallwood, Palo Alto, CA (US); Frederick R. Leach, San Francisco, CA (US); William Bullock, Palo Alto, CA (US)

(73) Assignee: FACEBOOK, INC., Menlo Park, CA (US)

( * ) Notice: Subject to any disclaimer, the term of this patent is extended or adjusted under 35 U.S.C. 154(b) by 288 days.

(21) Appl. No.: 16/000,747

(22) Filed: Jun. 5, 2018

(51) Int. Cl.
*G06F 7/20* (2006.01)
*G06N 5/02* (2006.01)
*G06N 20/00* (2019.01)
*G06F 16/2458* (2019.01)
*G06F 16/2457* (2019.01)

(52) U.S. Cl.
CPC ............ *G06F 16/2465* (2019.01); *G06F 7/20* (2013.01); *G06F 16/24575* (2019.01); *G06N 5/02* (2013.01); *G06N 20/00* (2019.01)

(58) Field of Classification Search
CPC ........... G06F 16/24575; G06F 16/2465; G06F 17/20; G06N 20/00; G06N 5/02
USPC ................................................. 707/749, 776
See application file for complete search history.

(56) References Cited

U.S. PATENT DOCUMENTS

| | | | |
|---|---|---|---|
| 7,620,952 B2* | 11/2009 | Havemose | G06F 9/465 705/50 |
| 10,243,945 B1* | 3/2019 | Kruse | H04L 63/0815 |
| 10,489,387 B1* | 11/2019 | Rogynskyy | G06F 16/289 |
| 2008/0098456 A1* | 4/2008 | Alward | G06F 21/316 726/1 |

* cited by examiner

*Primary Examiner* — Robert W Beausoliel, Jr.
*Assistant Examiner* — Pedro J Santos
(74) *Attorney, Agent, or Firm* — Keller Jolley Preece

(57) ABSTRACT

The present disclosure is directed toward systems, methods, and non-transitory computer readable media for generating an identity resolution model from a ground truth data set to accurately match users across one or more digital content providers to perform analyses of user activities across the one or more digital content providers. For example, the systems described herein can generate a ground truth data set of known users and utilize the ground truth data set to generate an identity resolution model for one or more digital content providers based on predicted user identities. Furthermore, in one or more embodiments, the systems utilize the identity resolution model to accurately resolve and match user identities between one or more digital content providers and assign universal identifiers to the user identities. Moreover, the disclosed systems can utilize the universal identifiers to provide analytical insights of user actions between the one or more digital content providers.

20 Claims, 15 Drawing Sheets

USER IDENTIFICATION SYSTEM

BACKGROUND

Advancements in computing devices and networking technology have led to a variety of innovations in managing data and utilizing data for analysis across computer networks. For example, conventional digital content systems are now able to manage, track, and store millions of bytes of data from multiple sources (i.e., digital content providers) and utilize that data for analysis. Indeed, conventional digital content systems are able to compare data from a digital content provider with other data managed by the conventional digital content system to generate an analysis for the provider of digital content.

Despite these advances, however, conventional digital content systems continue to have a number of problems. To illustrate, conventional digital content systems can manage data of users from multiple sources (i.e., more than one digital content provider) and analyze the data to generate an analysis for one or more digital content providers. Yet, when multiple digital content providers are involved, conventional digital content systems sometimes fail to make a reliable analysis based on data provided individually from the multiple digital content providers. For example, some conventional digital content systems compare data of users from multiple digital content providers to generate an analysis, however oftentimes conventional digital content systems fail to accurately match user identities and the data of those users amongst the multiple digital content providers resulting in an unreliable analysis.

Such failures to accurately match user identities and the data of those users between multiple digital content providers can have significant adverse effects on conventional digital content systems and the corresponding digital content providers. For instance, oftentimes, conventional digital content systems perform unreliable analyses as a result of inaccurately matched user identities between multiple digital content providers. In particular, inaccurately matched identities often inefficiently consume computational resources by performing analyses that result in unusable or unreliable information. Furthermore, unreliable analyses oftentimes deplete the budget of digital content providers in a conventional digital content system without gaining useful insights from the unreliable analyses. Unreliable analyses and corresponding data for the analyses sometimes also requires additional storage space in the computing system of a conventional digital content system. As a result, conventional digital content systems oftentimes occupy more data storage space than necessary.

Additionally, conventional digital content systems often have difficulty tracking statistics for user data spanning across multiple digital content providers. For example, conventional digital content systems sometimes cannot keep track of user actions across multiple digital content providers due to barriers between the digital content providers. In particular, conventional digital content systems oftentimes cannot keep track of user actions across multiple digital content providers because it is difficult, with accuracy, to realize if the same user is being tracked between the multiple digital content providers. The inability to track user actions across multiple digital content providers often leads to a misuse of computational resources because the conventional digital content system must utilize computational resources to guess, with a low yield in accuracy, which user identities match between the multiple digital content providers. For instance, some conventional digital content systems utilize an excess of communication bandwidth and computational resources by attempting to match user identities between the multiple digital content providers without the effort resulting in reliable matches.

Moreover, due to the unreliability of user identity matching between multiple digital content providers, oftentimes there is a barrier in accessing analytics data that is beneficial to any one of the digital content providers. For instance, some digital content providers do not have a registration-based system and, therefore, cannot accurately identify users within their systems. Specifically, some conventional digital systems limit the ability of a non-registration based digital content provider to utilize data analytics based on user actions across a network of multiple digital content providers because the non-registration based digital content provider does not always have enough data to determine a user identity internally. This barrier to accessibility disallows some digital content providers to efficiently utilize data that the digital content provider has gathered.

These and other problems exist with regard to user identification in digital environments.

SUMMARY

Embodiments described herein provide benefits and/or solve one or more of the foregoing or other problems in the art by providing methods, systems, and computer-readable media that generate an identity resolution model to reliably identify and match user identities and user data amongst multiple digital content providers. For instance, the disclosed systems and methods create a data set of known users (i.e., a ground truth data set) with corresponding data for the known users. Moreover, the disclosed systems and methods request predictions of user identities from one or more digital content providers based on the data contained within the ground truth data set, without providing the user identity of the known user. After receiving predictions of user identities from the one or more digital content providers, the disclosed systems and methods utilize these predicted user identities to evaluate the accuracy of the predicted user identities for each individual digital content provider. The disclosed systems and methods utilize the evaluated accuracies to generate an identity resolution model that is capable of determining user identities and matching user identities for unknown users amongst the multiple digital content providers.

For example, in some embodiments, after generating the identity resolution model, the disclosed systems and methods provide the digital content providers with the identity resolution model and data elements of an unknown user and request a predicted user identity for the unknown user. Once the disclosed systems and methods receive the predicted user identities for the unknown user from the multiple digital content providers based on the identity resolution model, the disclosed systems and methods utilize the predicted user identities to determine a digital universal identifier for the unknown user. Moreover, in some embodiments, the disclosed systems and methods can receive analytics data tied to the digital universal identifier for a user from the digital content providers and utilize the analytics data to perform aggregated analytics for the combined data of the user.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments with additional specificity and detail by referencing the accompanying figures. The following paragraphs briefly describe those figures, in which.

DETAILED DESCRIPTION

Figure 1:
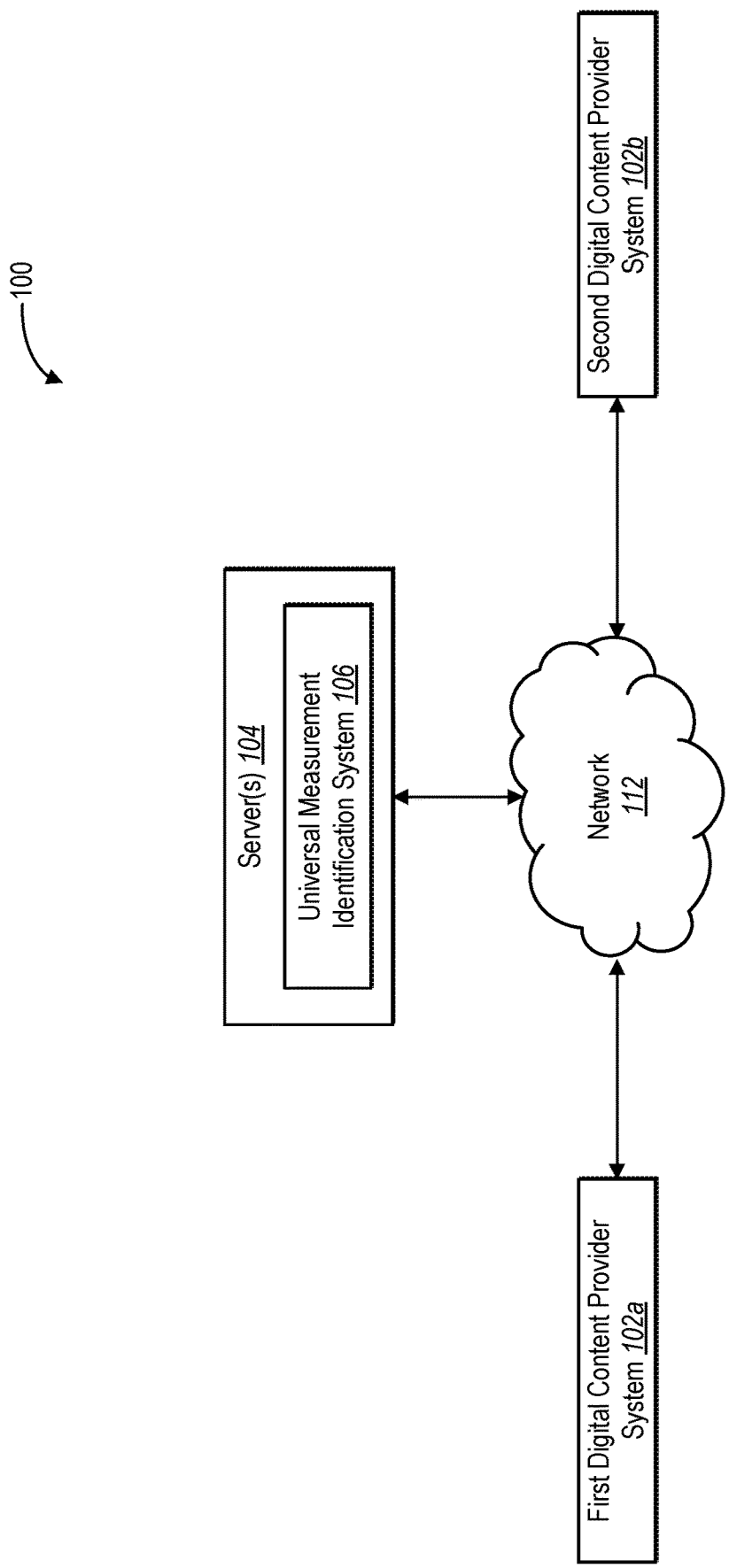
FIG. 1 illustrates a schematic diagram of an example environment of a universal measurement identification system in accordance with one or more embodiments.

One or more embodiments disclosed herein include a universal measurement identification system that generates and provides an identity resolution model to reliably identify and match user identities and user data amongst multiple digital content provider systems. In particular, the universal measurement identification system can generate a ground truth data set based on known users, receive predictions from the multiple digital content providers based on the user data elements of the ground truth data set, evaluate the accuracy of each digital content provider based on the received predictions and the ground truth data set, and utilize the evaluated accuracies to generate an identity resolution model to resolve user identities for any user. For instance, in one or more embodiments, the universal measurement identification system resolves user identities for unknown users by providing the generated identity resolution model to the digital content providers and obtaining predicted user identities for unknown users that are received from the digital content providers based on the identity resolution model. Furthermore, the universal measurement identification system utilizes the predicted user identities based on the identity resolution model to generate a digital universal identifier for the unknown user. Additionally, in some embodiments, the universal measurement identification system utilizes the generated digital universal identifier to perform aggregated analytics tasks for user analytics data from the multiple digital content providers.

To illustrate, in one or more embodiments, the universal measurement identification system generates a ground truth data set comprising user identities of known users and data elements for those known users. For instance, in some embodiments, the universal measurement identification system identifies users and user data for users in the system that are known to be correctly identified and creates a data set comprising those known users and the data of those known users. The universal measurement identification system can then utilize the generated ground truth data set to evaluate the accuracy of digital content providers in determining user identities.

For example, in one or more embodiments, the universal measurement identification system utilizes the ground truth data set to obtain user identity predictions from the digital content providers and evaluate those predictions. Specifically, in some embodiments, the universal measurement identification system provides the user data elements of the ground truth data set, without providing the user identities, to the digital content providers and requests the digital content providers to predict the user identities based on the user data elements. Furthermore, in one or more embodiments, upon obtaining the predicted user identities from the digital content providers, the universal measurement identification system evaluates those predicted user identities by utilizing the known user identities from the ground truth data set.

In some embodiments, the universal measurement identification system generates an identity resolution model for the digital content providers based on the evaluated accuracies of the predicted user identities from the ground truth data set. For example, in one or more embodiments, the universal measurement identification system utilizes the evaluated accuracies of the predicted user identities from the digital content providers to create a model of weighted scores for each of the digital content providers based on the data elements used to predict the user identity. Moreover, in some embodiments, the identity resolution model comprises weighted scores for digital content providers based on more than one unique combinations of data elements utilized in predicting the user identity. The universal measurement identification system, in one or more embodiments, also utilizes machine learning models to generate the identity resolution model.

Furthermore, the universal measurement identification system, in some embodiments, utilizes the generated identity resolution model to generate digital universal identifiers for subsequent user identities. For instance, in one or more embodiments, the universal measurement identification system obtains data elements not associated with any known user in the system and provides these data elements to multiple digital content providers for the purpose of receiving a predicted user identity for the unknown user from the digital content providers. Additionally, in some embodiments, the universal measurement identification system provides the generated identity resolution model to the digital content providers. For instance, the digital content providers can predict user identities for the unknown users and utilize the identity resolution model to provide the predicted user identities with an prediction accuracy score to the universal measurement identification system. Upon receiving the predicted user identities for the unknown users, the universal measurement identification system, in some embodiments, determines the most accurate user identity from the predicted user identities provided by the digital content providers based on the prediction accuracy scores. Once the universal measurement identification system determines the most accurate user identity to associate with the data elements for the unknown user, the universal measurement identification system can provide a digital universal identifier and a resolved user identity for the unknown user.

Furthermore, in one or more embodiments, the universal measurement identification system utilizes the digital universal identifier with analytics data available from the digital content providers to perform aggregated analytics tasks for the users and user data available amongst the digital content providers.

The universal measurement identification system provides numerous advantages and benefits over conventional digital content systems. Indeed, as discussed above, inaccurate user identity matches across multiple digital content providers can lead to unreliable analysis of user data that involves more than one digital content provider, leading to an unproductive use of computational resources. The universal measurement identification system utilizes an identity resolution model to resolve to a user identity for certain data elements based on information from all of the digital content providers and, thus, establishes a baseline user identity match for all digital content providers to produce reliable analyses of user data that involves more than one digital content provider. Furthermore, by having user identities matched accurately across the multiple digital content provider systems, the universal measurement identification system is able to provide the reliable analysis for a user without utilizing additional computational resources to predict user identities from each digital content provider system. Furthermore, in some embodiments, the universal measurement identification system does not need to determine the integrity of analyses performed for data from multiple digital content providers based on a matched user identity and, therefore, utilizes less computational resources. Moreover, the universal measurement identification system will less frequently need to compute and discard unreliable user data analyses resulting in a more efficient use of computational resources.

In addition, because the universal measurement identification system results in an accurate digital universal identifier, for each user, that matches user identities over multiple digital content provider systems, the universal measurement identification system also improves the efficiency of utilizing computational resources to track user statistics (i.e., user actions) between the multiple digital content provider systems. Accordingly, the universal measurement identification system can utilize less communication bandwidth and computational resources while tracking user statistics over multiple digital content provider systems with a greater amount of accuracy.

Moreover, by utilizing the digital universal identifier for user identities across the digital content provider systems, the universal measurement identification system provides access to user data based analyses to any type of digital content provider. In particular, because the user identity is determined by the universal measurement identification system, some digital content providers that did not have access to data analyses of data held by multiple digital content providers (i.e., as a result of being unable to individually match or identify user identities based on data elements available to the particular digital content provider) can now utilize the digital universal identifier to have access to data analyses. Furthermore, more data is available to the universal measurement identification system because more digital content providers can participate due to the low barrier of entry. As a result, compared to some conventional digital content services, the universal measurement identification system can utilize more data (from an increased participation of digital content providers) and utilize computational resources efficiently to generate more robust analyses of data between the digital content providers.

As used herein, the term "user" refers to a person that utilizes any network and/or system. In particular, the term "user" refers to a person that performs actions on any network. For example, in some embodiments, a user includes, but is not limited to, a person that accesses an online retailer service (i.e., an e-commerce website), an online news service, and/or an online social media service.

As used herein, the term "provider" (sometimes referred to as "digital content provider" or "provider system") refers to any digital entity that performs actions comprising user data elements. In particular, the term "provider" refers to any digital entity that handles, stores, utilizes, or receives user data elements. For example, a provider, in some embodiments, includes, but is not limited to, an online social media service, an online retail service, an online news service, a physical retail service, and/or an online media service.

As used herein, the term "user identity" refers to any information relating to the classifying characteristics of a user (i.e., a person). In particular, the term "user identity" refers to information that classifies who or what a user is. For example, a user identity can be represented as any type of information including, but not limited to, a person's name, a digital textual ID, a digital numerical ID, and a digital alpha-numerical ID. More specifically, user identity, in some embodiments, includes the classification of a person in a digital environment whereas all other data elements relating to the user are also coupled with the classification. For instance, a user may be associated to data elements such as a phone number (111-222-3333) and an address (123 Main St.) and classified with a user identity of "John." In this instance, the data elements "111-222-3333" and "123 Main St." are coupled to the user identity of "John."

More detail regarding the universal measurement identification system will now be provided with reference to the figures. For example, FIG. 1 illustrates a schematic diagram of an example environment 100 for implementing a universal measurement identification system 106 in accordance with one or more embodiments. An overview of the universal measurement identification system 106 is described in relation to FIG. 1. Thereafter, a more detailed description of the components and processes of the universal measurement identification system 106 is provided in relation to the subsequent figures.

As shown in FIG. 1, the environment 100 includes server(s) 104, the first digital content provider system 102*a* and the second provided system 102*b* (referred to herein collectively as "digital content provider systems 102"), and a network 112. Each of the components of the environment 100 can communicate via the network 112, and network 112 may be any suitable network over which computing devices can communicate. Example networks are discussed in more detail below in relation to FIGS. 10 and 11.

As illustrated in FIG. 1, the server(s) 104 include the universal measurement identification system 106. For example, the universal measurement identification system 106 may be implemented by \ the server(s) 104 as hardware, software, or both. In some embodiments, server(s) 104 performs as an intermediate data environment. As used herein, the term "intermediate data environment" (sometimes referred to as a "safe server") refers to a server that is neutral from influence by a singular digital content provider. In particular, the term "intermediate data environment" refers to a server that manages data for multiple digital content providers without allowing access to data of each digital content provider to the other digital content providers. For example, in some embodiments, the intermediate data environment includes (i.e., may implement) the universal measurement identification system 106. Additionally, the intermediate data environment, in some embodiments, collects user data and analytics data provided by each of the digital content providers and performs aggregated analytic tasks with the collected user data and analytics data without sharing the user data and analytics data of any single digital content provider. Furthermore, the intermediate data environment can include a kill switch to remove the data of a single digital content provider if that digital content provider suspects misuse of data provided by that digital content provider. In one or more embodiments, the intermediate data environment can be established by a third party not affiliated with the universal measurement identification system or the digital content providers. In some embodiments, some or all the components of the universal measurement identification system 106 can be implemented in the intermediate data environment to safeguard user data privacy amongst the one or more digital content providers. Furthermore, in one or more embodiments, the environment 100 can perform as an intermediate data environment for the universal measurement identification system 106.

Although FIG. 1 depicts the universal measurement identification system 106 located on the server(s) 104, in some embodiments, the universal measurement identification system 106 may be implemented (e.g., located entirely or in part) on one or more other components of the environment 100. For example, the universal measurement identification system 106 may be implemented by the digital content provider systems 102, the server(s) 104, and/or the network 112.

By the way of example, in one or more embodiments, the universal measurement identification system 106 provides (e.g., via the server(s) 104 and network 112) data elements from a known user from a ground truth data set to the digital content provider systems 102. Moreover, the digital content provider systems 102 provide predicted user identities to the universal measurement identification system 106 via the network 112.

Moreover, in some embodiments, the universal measurement identification system 106 evaluates the predicted user identities from the digital content provider systems 102 to generate an identity resolution model. In some embodiments, the identity resolution model is generated and stored in the server(s) 104 by the universal measurement identification system 106. Furthermore, the universal measurement identification system 106 can generate the identity resolution model and provide the identity resolution model to the digital content provider systems 102 and/or the network 112.

Additionally, the universal measurement identification system 106 can utilize the generated identity resolution model to resolve the identity of users in the environment 100. For example, in one or more embodiments, the universal measurement identification system 106 provides user data elements of unknown users and the identity resolution model to the digital content provider systems 102 and requests predicted user identities from the digital content provider systems 102 from those user data elements of unknown users. The digital content provider systems 102 can then predict user identities for the unknown users and utilize the identity resolution model to determine a prediction accuracy score for the predicted user identities. After receiving the predicted user identities for the unknown users and the prediction accuracy scores, the universal measurement identification system 106 can utilize the prediction accuracy scores to resolve the user data elements of the unknown user to a universal identifier for each digital content provider on the universal measurement identification system. In one or more embodiments, the universal measurement identification system 106 can utilize the provided prediction accuracy scores to resolve user data elements of known users for each digital content provider on the universal measurement identification system 106. In some embodiments, the universal measurement identification system 106 also provides the universal identifier to the digital content provider systems 102.

In one or more embodiments, the universal measurement identification system 106 also receives user analytics data based on the universal identifier from the digital content provider systems 102. The universal measurement identification system 106, in some embodiments, utilizes the user analytics data from the digital content provider systems 102 and the universal identifiers to perform aggregated analytic tasks. Furthermore, the universal measurement identification system 106 can provide the aggregated analytics resulting from the aggregated analytic tasks to the digital content provider systems 102.

Also, although FIG. 1 illustrates server(s) 104 and/or universal measurement identification system 106 communicating to digital content provider systems 102 via network 112, the universal measurement identification system 106 may communicate with the digital content provider systems 102 directly, bypassing the network 102, and using an appropriate communication protocol. To illustrate, the universal measurement identification system 106 may communicate with the digital content provider systems 102 to provide and receive user data elements to determine user identities and user analytics data to perform aggregated analytic tasks.

Furthermore, although FIG. 1 only illustrates a first digital content provider system 102a and a second digital content provider system 102b, the environment 100 can comprise any number of provider systems. The digital content provider systems 102 each communicate with the universal measurement identification system 106 either directly or through the network 112 (as shown). Moreover, although it is not shown in FIG. 1, the environment 100 can also include client devices that provide user data elements and user analytics data to the digital content provider systems 102, the server(s) 104, and/or the network 112.

Figure 2A:
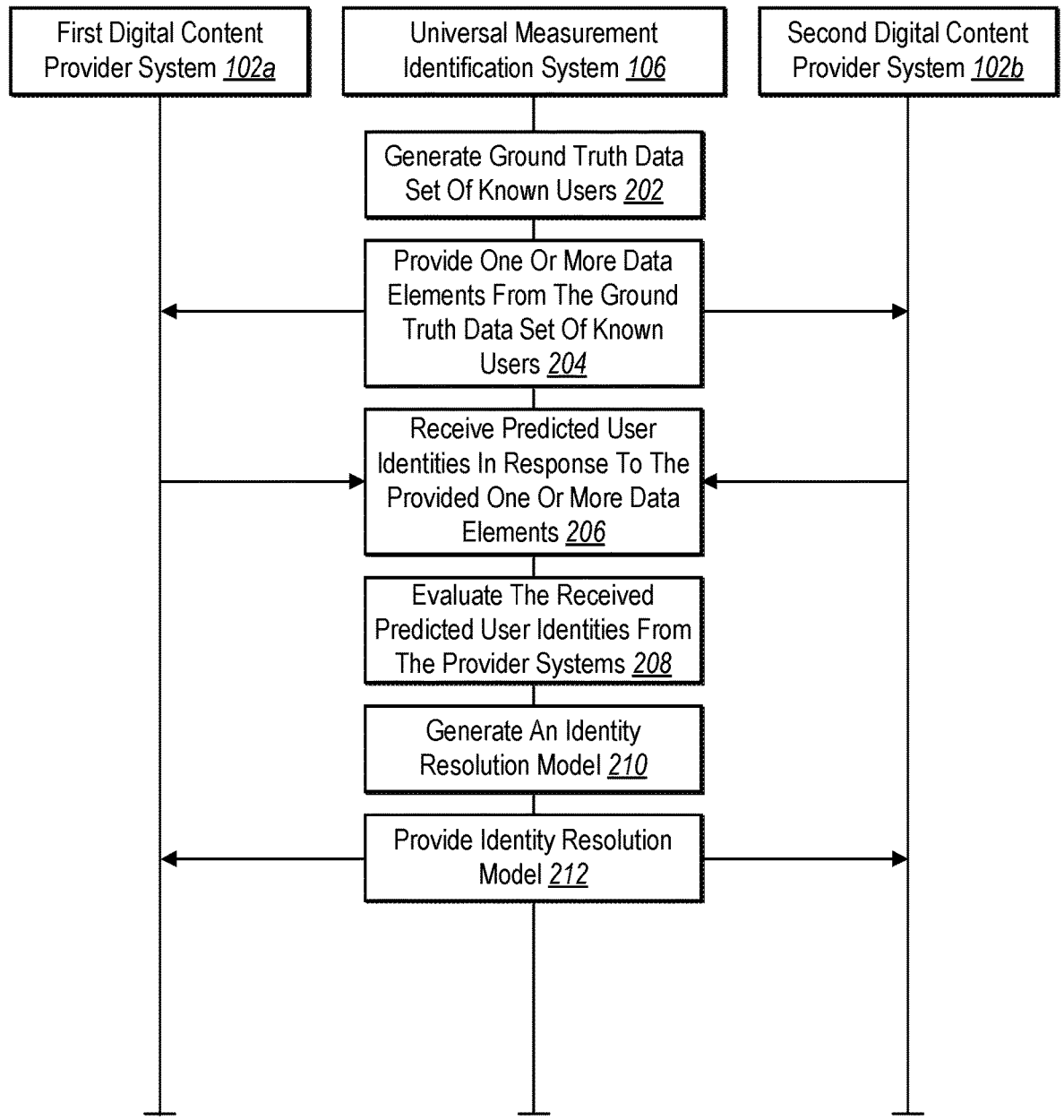
FIGS. 2A-2B illustrate a sequence diagram of an example universal measurement identification system generating and utilizing an identity resolution model by utilizing a ground truth data set in accordance with one or more embodiments.
Figure 2B:
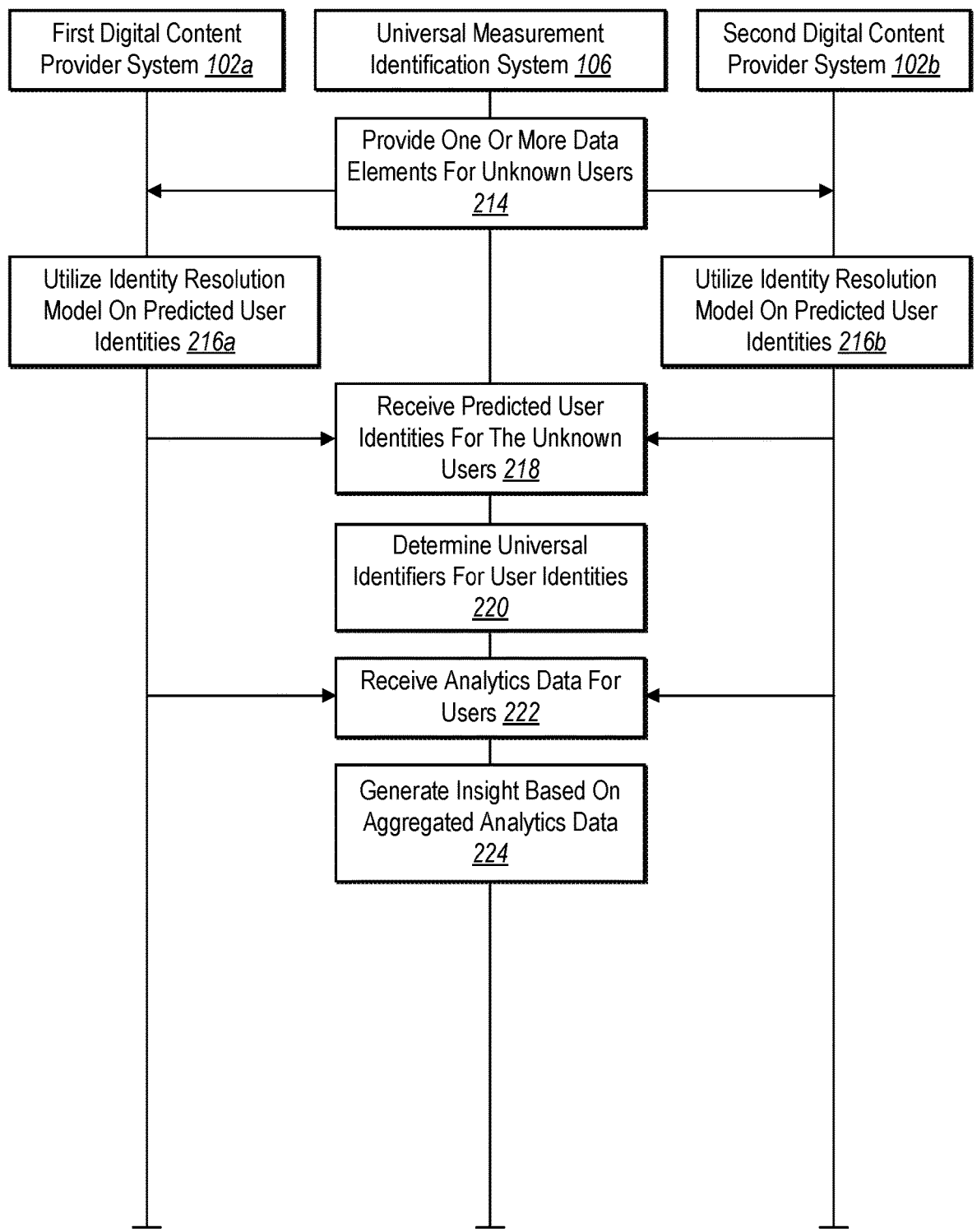

As just mentioned, the universal measurement identification system 106 can generate a ground truth data set and utilize the ground truth data set to generate an identity resolution model capable of resolving user identities for multiple users within one or more digital content provider systems. Furthermore, the universal measurement identification system 106 can utilize the generated identity resolution model to perform aggregated analytics tasks. For example, FIG. 2A illustrates a universal measurement identification system 106 that generates a ground truth data set based on known users and utilizes the ground truth data set to generate an identity resolution model. Moreover, FIG. 2B illustrates a universal measurement identification system 106 that utilizes the generated identity resolution model and analytics data received from digital content providers to perform aggregated analytics tasks.

As shown in FIG. 2A, the universal measurement identification system 106 generates a ground truth data set based on known users 202, provides one or more data elements from the ground truth data set of known users to digital content providers 204, receives predictions from the multiple digital content providers based on the user data elements of the ground truth data set 206, evaluates the accuracy of each digital content provider based on the received predictions and the ground truth data set 208, and utilizes the evaluated accuracies to generate an identity resolution model to resolve user identities for any user 210. Moreover, the universal measurement identification system 106 provides the generated identity resolution model to the digital content providers 212.

For instance, in one or more embodiments, the universal measurement identification system 106 generates a ground truth data set of known users 202 and provides one or more data elements from the ground truth data set of known users 204 to a first digital content provider system 102a and a second digital content provider system 102b. Furthermore, in some embodiments, the universal measurement identification system 106 receives predicted user identities in response to the provided one or more data elements from the ground truth data set 206 and evaluates the received predicted identities from the provider systems 208 in order to generate an identity resolution model 210 and provide the identity resolution model to the digital content provider systems 212. The universal measurement identification system 106 can utilize the one or more provided identity resolution models to identify one or more identities for one or more unknown users (discussed in greater detail in FIG. 2B).

As shown in FIG. 2A, the universal measurement identification system 106 generates a ground truth data set of known users 202. As used herein, the term "ground truth data set" refers to a collection of information (i.e., a data set) utilized to evaluate the capability of determining user identities. In particular, the term "ground truth data set" refers to a data set comprising of known users and data elements of the known users to evaluate prediction accuracy scores from digital content providers. For instance, in some embodiments, the universal measurement identification system 106 collects data elements for known users and associates the collected data elements with the respective known users for each collected data element to generate a ground truth data set. The ground truth data set can include, but is not limited to, a data table, a string, an array, and/or vertices. The ground truth data set can comprise of any number of known users. In some embodiments, in order to provide a more nuanced evaluation of the digital content provider systems 102 ability to predict user identities, the ground truth data set comprises a large number of known users (i.e., thousands of known users).

Moreover, as used herein, the term "data elements" refers to any information available in digital format that can be utilized for user identification. In particular, the term "data elements" refers to information that can be stored on a digital medium (i.e., a database) that can be associated with a specific user for user identification purposes. Data elements can be represented as text, numbers, flags, alphanumeric values, and other informational representations. More specifically, data elements can include information available in digital format that can characterize and identify users such as place of residence, E-mail addresses, phone numbers, birthdates, membership serial numbers, and/or other information specific to persons. Furthermore, data elements can also include online user actions such as, but not limited to, a user's session time, browser characteristics, cookies, download history, or purchasing history and device characteristics such as, but not limited to, device type, operating system, IP addresses, device IDs, hardware serial numbers, browser versions, and/or sensor data.

Furthermore, as used herein, the term "known user" refers to any user capable of digital identification with a level of certainty by a system. In particular, the term "known user" refers to a user that performs actions on any network while having a digital identifier associated with the user that is capable of identifying the user with a level of certainty by a network. More specifically, in some embodiments, known user includes a user (i.e., a person) with digitally stored information on a network, whereas the network has identified the user and the information of the user to a specific user identity with a rate of accuracy that exceeds a threshold accuracy rate established by the network. For instance, a user may access a retailer website and provide the retailer web site with personal information (i.e., data elements) such as a name, a residential address, a phone number, and an email address. The retailer website, in one or more embodiments, categorizes the user as a known user because the user has directly provided the information to the retailer web site (i.e., a high rate of accuracy). However, a user does not need to directly provide information for the user to be a known user. For instance, the retailer website can decide the user identity with accuracy based on cookie sharing, login information, payment information, personal information, government issued IDs, and/or other methods to categorize a user as a known user.

In some embodiments, the universal measurement identification system 106 generates a ground truth data set of known users 202 by identifying a source of known users, collecting data elements for the known users, and organizing the data elements for the known users. In particular, the universal measurement identification system 106 can identify a source of known users and collect data elements for the known users in an intermediate data environment to maintain privacy for the users corresponding to the collected data elements. For example, the collected data elements (that are identified as user identifiable data elements) and the ground truth data set remain on the intermediate data environment and are not shared and/or exposed to other digital content providers. Furthermore, the universal measurement identification system 106 can organize the collected data elements of known users into a ground truth data set on the intermediate data environment.

For instance, the universal measurement identification system 106 can identify a source of known users by selecting a source (i.e., a provider, a third party data source, and/or internal data) that receives user data elements at a high rate of accuracy and/or with one or more steps of user verification. For example, as mentioned above, a retail website that requires users to provide accurate information such as billing information can be a source that receives user data elements at a high rate of accuracy. Additionally, other sources of known users, include, but are not limited to, online services that require memberships and/or subscriptions, retail memberships, social media network accounts, and phone services. For example, a social network account can determine that a browser cookie (i.e., a data element) corresponds to a user with a high rate of accuracy because a user must authenticate before accessing a social network account through a browser. Additionally, a retail membership can require a person to provide proof of residence and/or a phone number in order to begin a membership account. As a result, a retail store can receive user data elements such residential addresses and phone numbers with a high rate of accuracy for users and can establish such users as known users.

Additionally, in some embodiments, a source of known users can include a source (i.e., a provider, a third party data source, and/or internal data) that utilizes one or more steps of user verification. For example, a digital content provider that requires authentication before accessing user specific data on the online services of a digital content provider can require a user to verify the identity of the user through a code sent to a phone number and/or email associated with the user. Furthermore, in some embodiments, to recognize a user as a known user, digital content providers require users to provide other forms of identification including, but not limited to, government issued IDs, and/or mailing addresses on utility bills to verify the identity of users. For instance, a digital content provider can utilize methods such as, but not limited to, two-factor authentication, multi-factor authentication, strong authentication, and continuous authentication. The universal measurement identification system 106, in some embodiments, recognizes users and associated user data elements that have undergone such steps of verification as known users.

Furthermore, in some embodiments, the universal measurement identification system 106 can utilize internal data as a source for known users when the user data elements associated with users are known to be collected with a high rate of accuracy or have undergone one or more steps of verification. For instance, in some embodiments, the universal measurement identification system 106 can operate on a digital content provider to generate a ground truth data set by utilizing user data elements available from the digital content provider. In some embodiments, the digital content provider can generate the ground truth data set from known user data elements identified on the digital content provider system and provide the ground truth data set to the intermediate data environment. Furthermore, in some embodiments, the intermediate data environment can utilize data that is already identified as known user data and available on the intermediate data environment to generate the ground truth data set.

After identifying a source of known users, the universal measurement identification system 106 can collect the data elements associated with the known users into a ground truth data set. For example, in one or more embodiments, the universal measurement identification system 106 can request data elements associated with the known users (with the association between the data elements and the known user designated) from an identified source of known users (i.e., a digital content provider). In some embodiments, the universal measurement identification system 106 requests data elements of known users from partnering digital content providers such as, but not limited to, digital content providers that have created a system or agreement to provide data without comprising the privacy of users to the universal measurement identification system 106. For instance, in some embodiments, the identified source of known users (i.e., a digital content provider) can provide the data elements of the known users to the universal measurement identification system 106 in an intermediate data environment. Furthermore, the universal measurement identification system 106 can prevent the data elements of the known users from each digital content providers from being viewed or accessed by the other digital content providers.

Furthermore, after identifying and collection data elements of known users, the universal measurement identification system 106 can organize the data elements of known users to generate a ground truth data set of known users 202. For example, the universal measurement identification system 106 can create a data table comprising rows for each known user and the data elements associated with each known user. In some embodiments, the universal measurement identification system generates and/or maintains the generated ground truth data set of known users in the intermediate data environment. To illustrate, the ground truth data set of known users can include a phone number "111-222-4444" and other user data elements associated with the phone number "111-222-4444" such as an email address "e@email.com," an IP address 192.168.1.32, and a name "Johnny Miller" after it has been determined that this information is accurate.

Moreover, universal measurement identification system 106 can include an identifier such as a numerical ID or a universal measurement ID (hereinafter referred to as "UMID") for each known user. As used herein, the term "identifier" (sometimes referred to as "universal identifier," "universal measurement ID," or "UMID") refers to a tag utilized for classification of a user. In particular, the term "identifier" refers to an informational tag that is utilized for the unique classification of a user identity. The informational tag can be in the form of, but is not limited to, text, numbers, serial codes, and/or a scanning image. More specifically, the identifier is a unique tag that represents a user identity in a system and is unique to each separate user. For example, a system can determine that a phone number belong to a person named "Johnny Miller" and generate an identifier for "Johnny Miller" and the associated phone number. As a result, the system can generate a numerical identifier of "123" for Johnny Miller. Furthermore, the system can associate all current and subsequent information (i.e., data elements) for Johnny Miller to the identifier of "123".

In addition to generating a ground truth data set of known users 202, the universal measurement identification system 106 can also provide the data elements from the ground truth data set to one or more provider systems. For instance, as shown in FIG. 2A, the universal measurement identification system 106 provides one or more data elements from the ground truth data set of known users 204 to a first digital content provider system 102a and a second digital content provider system 102b. As mentioned above, the universal measurement identification system can provide one or more data elements from the ground truth data set of known users 204 to any number of digital content providers. Furthermore, the universal measurement identification system 106 can provide the user data elements to one or more digital content providers within an intermediate data environment and require the one or more digital content providers to perform user identity predictions within the intermediate data environment. Additionally, as mentioned above, the universal measurement identification system 106 can provide any number of data elements for any number of known users to the one or more digital content providers. For example, the universal measurement identification system 106 can provide hundreds of thousands of data elements for known users from the ground truth data set.

In some embodiments, the universal measurement identification system 106 provides the one or more data elements 204 without providing additional information for the known user from the ground truth data set. For example, the universal measurement identification system 106 can omit one or more data elements that are available to the universal measurement identification system 106 and only provide select data elements to the digital content provider systems 102 from the ground truth data set. Furthermore, the universal measurement identification system 106 can request the digital content provider systems 102 to, exclusively, utilize the provided data elements when performing predictions of user identities.

Additionally, in one or more embodiments, the universal measurement identification system 106 provides the one or more data elements from the ground truth data set 204 with various types of requests for a predicted user identity. For example, the universal measurement identification system 106 can provide a data element, such as phone number, and request the digital content provider systems 102 to predict user identity data elements such as a first name and a last name associated with the provided phone number. In some embodiments, the universal measurement identification system 106 can request all available data corresponding to the provided data elements as the predicted user identity. Moreover, the universal measurement identification system 106 can request the digital content provider systems 102 to provide a label and/or ID associated with the predicted user identity, matching the provided data elements, in the databases of the digital content provider systems 102. The universal measurement identification system 106 can request any other combination of data elements as predictions from the digital content provider systems 102. For instance, the universal measurement identification system 106 can request an IP address as the requested user identity, instead of a first name and a last name.

Furthermore, the universal measurement identification system 106 can provide various combinations of data elements from the ground truth data set 204 to the digital content provider systems 102. For example, in one or more embodiments, the universal measurement identification system 106 can provide selected combinations of data elements from the ground truth data set of known users to evaluate the predicted user identities from the provider systems 208 based on the specific combinations of data elements. To illustrate, in some embodiments, the selected combination of data elements can include combinations such as, but not limited to, a phone number and an email address, a residential address and an IP address, or an IP address, a first name, a last name, and an email address.

Additionally, the universal measurement identification system 106 can track the combination of data elements from the ground truth data set of known users provided to the digital content provider systems 102 to generate an identity resolution model 210 for specific combinations of data elements used to predict user identities. For instance, the universal measurement identification system 106 can provide data elements from the ground truth data set to the provider systems 204 more than once by providing various combinations of the data elements to the provider systems in different requests for user identities from the provider systems. Moreover, the universal measurement identification system 106 can label each request for predicted user identities based on the combination of data elements from the ground truth data set provided and the requested type of user identity. For instance, the universal measurement identification system 106 can provide a first set of data elements from the ground truth data set in which the provided data elements include phone numbers and email addresses for the known users and a request for IP addresses as the predicted user identity. Furthermore, in one or more embodiments, the universal measurement identification system 106 provides a second set of data elements from the ground truth data set in which the provided data elements include residential addresses, first names, and last names for the known users and a request for phone numbers as the predicted user identity. Likewise, the universal measurement identification system 106 can provide any number of combinations of data elements from the ground truth data set to the provider systems and request user identities comprising of various data elements in order to generate one or more identity resolution models.

To illustrate, the universal measurement identification system 106 can select the requested predicted user identity to be an IP address and provide the digital content provider systems 102 with phone numbers as the data elements from which to predict the user identities. Indeed, continuing the example from above, the universal measurement identification system 106 can provide the digital content provider systems 102 with the phone number "111-222-4444" without providing other data elements such as email address "e@email.com" and name "Johnny Miller" and request the provider systems to predict the IP address associated with the phone number "111-222-4444".

As shown in FIG. 2A, after the universal measurement identification system 106 provides one or more data elements from the ground truth data set of known users 204 to the digital content provider systems 102, the universal measurement identification system 106 receives predicted user identities 206 from the first digital content provider system 102a and the second digital content provider system 102b. For example, the universal measurement identification system 106 can receive predicted user identities in response to the provided one or more data elements 206 from the digital content provider systems 102 based on a requested type of user identity. As mentioned above, the universal measurement identification system 106 can request specific type of data elements for the predicted user identity. In one or more embodiments, the universal measurement identification system 106 can receive predicted user identities 206 as a data set that associates the predicted user identity data elements with the data elements from the ground truth data set of known users provided by the universal measurement identification system 204.

Additionally, in one or more embodiments, the digital content provider systems 102 utilize the one or more data elements from the ground truth data set provided by the universal measurement identification system 106 to predict user identities for those data elements within the digital content provider systems 102. In some embodiments, the digital content provider systems 102 can each utilize a user identity prediction system available to each digital content provider systems 102 to predict user identities from the provided one or more data elements from the ground truth data set of known users 204. For example, each digital content provider can utilize a proprietary prediction system to predict the user identities based on the provided one or more data elements from the ground truth data set of known users 204.

Additionally, in some embodiments, the universal measurement identification system 106 can receive an ID tag utilized by each provider system to identify the user corresponding to the one or more data elements from the ground truth data set of known users provided by the universal measurement identification system 204. For example, a provider system can predict a user identity from the data of the provider system for the one or more data elements from the ground truth data set and also designate an ID corresponding to the predicted user identity and corresponding to the one or more matching data elements from the ground truth data set in the data of the provider system.

To illustrate, for the name "Johnny Miller" from above, the universal measurement identification system 106 can receive user identity predictions, the IP address, from the digital content provider systems 102 for the provided phone number "111-222-4444." For instance, the first digital content provider system 102a may utilize the data and user identity prediction systems available to the first digital content provider system 102a to determine that the phone number "111-222-4444" belongs to IP address 192.168.1.222, which corresponds to first digital content provider system 102a ID 999. Furthermore, the second digital content provider system 102b may utilize the data and user identity prediction systems available to the second digital content provider system 102b to determine that the phone number "111-222-4444" belongs to IP address 192.168.1.32, which corresponds to second digital content provider system 102b ID A53. In some embodiments, the digital content provider systems 102 provide this predicted user identity data for phone number "111-222-4444" to the universal measurement identification system 104.

Furthermore, the universal measurement identification system 106 may not receive a predicted user identity in response to one or more provided data elements 206. For instance, a digital content provider may not have any matching information for the one or more data elements provided by the universal measurement identification system 106. As a result, in some embodiments, the universal measurement identification system 106 may receive a flag or ID signifying that no matching user identity was found or predicted by a provider system for one or more data elements from the ground truth data set of known users. In some embodiments, a provider system may predict a user identity for one or more data elements from the ground truth data set of known users even when the provider system does not have an accurate match for the one or more data elements. The universal measurement identification system 106 may receive such predicted user identities in response to the provided one or more data elements 206 and utilize the received predicted user identities to generate an identity resolution model 210.

As mentioned above, a digital content provider can implement data and user identity prediction systems of the digital content provider on the intermediate data environment in order to protect the privacy of user data between the one or more provider systems and the universal measurement identification system 106. Furthermore, the universal measurement identification system 102 can provide the one or more data elements from the ground truth data set of known users 204 to the digital content provider within the intermediate data environment and receive predicted user identities in response to the provided one or more data elements 206 from within the intermediate data environment.

After the universal measurement identification system 106 receives the predicted user identities in response to the provided one or more data elements from the ground truth data set 206 from the digital content provider systems 102, the universal measurement identification system 106 can evaluate the received predicted user identities 208 in order to generate an identity resolution model 210. For example, in some embodiments, the universal measurement identification system 102 compares the predicted user identities from the digital content provider systems 102 with the data elements in the ground truth data set for known users. Additionally, the universal measurement identification system 106 can generate a prediction accuracy score for each provider system 102 based on the comparison between the predicted user identities and the ground truth data set of known users. Moreover, in some embodiments, the universal measurement identification system 102 utilizes the prediction accuracy scores for each provider system 102 to generate one or more identity resolution models 210.

As used herein, the term "prediction accuracy score" refers to information indicating the capability of an entity to successfully perform specific actions. In particular, the term "prediction accuracy score" refers to information indicating the capability of a digital content provider has in predicting (or identifying) a user identity based on user data elements. A prediction accuracy score can be represented as, but is not limited to, a percentage, an alphabetical grade, and a numerical rating that ranks more than one digital content providers. More specifically, the prediction accuracy score is assigned by the universal measurement identification system 106 to a digital content provider based on the accuracy of user identity predictions from the user data elements provided to a digital content provider. For instance, in one or more embodiments, the universal measurement identification system 106 assigns a prediction accuracy score of a 90% to a digital content provider if the digital content provider accurately predicts 9 out of 10 user identities from a ground truth data set of known users.

As just mentioned, the universal measurement identification system 106 can evaluate the received predicted user identities from the provider systems 208 to generate a prediction accuracy score. For example, the universal measurement identification system 106 can compare the predicted user identities and the provided data elements from the ground truth data set of known users for the predicted user identities with the data element from the ground data set of known users to determine the accuracy of the predicted user identities. To illustrate, the universal measurement identification system 106 can evaluate the predicted user identities received from first digital content provider system 102a and second digital content provider system 102b in the example above for the phone number "111-222-4444." For instance, the universal measurement identification system 106 can determine that the predicted user identity from first digital content provider system 102a (the IP address 192.168.1.222 and the first digital content provider system 102a ID 999) does not correspond with the data elements in the ground truth data set for known users having the phone number "111-222-4444" (the IP address 192.168.1.32). Additionally, the second digital content provider system 102b user identity prediction (the IP address 192.168.1.32 and the second digital content provider system 102b ID A53) does correspond with the data elements in the ground truth data set for known users having the phone number "111-222-4444."

In some embodiments, the universal measurement identification system 106 can generate prediction accuracy scores based on the received user identity predictions from the digital content provider systems 102. For instance, continuing the example from above, based on only the one user identity prediction, the universal measurement identification system 106 can determine that the first digital content provider system 102a has a prediction accuracy score of 0 percent based on the predicted IP address 192.168.1.222. Furthermore, the universal measurement identification system 106 can determine that the second digital content provider system 102*b* has a prediction accuracy score of 100 percent based on the predicted IP address 192.168.1.32. In some embodiments, prediction accuracy score for the digital content provider systems 102 can change depending the number of correctly predicted user identities by the digital content provider systems 102.

Moreover, the universal measurement identification system 106 can evaluate the received predicted user identities from the provider systems 208 with various methods. For example, the prediction accuracy score can be different for each combination of user data elements provided and type of user identity requested. Furthermore, the universal measurement identification system 106 can provide other ranking systems that provide a rank to a system provider 102 based on user identity predictions (i.e., user data elements). For instance, the universal measurement identification system 106 can provide a rank to a provider system when the provider system reaches a particular threshold of correctly predicted user identities.

In addition to evaluating the received predicted user identities from the provider systems 208, the universal measurement identification system 106 can also generate an identity resolution model 210. As used herein, the term "identity resolution model" refers to a structure utilized for the purposes of making classification decisions. In particular, the term "identity resolution model" refers to a structure utilized to determine user identities from information received from one or more digital content providers. The identity resolution model can be represented in many types of structures, including, but not limited to a data table, a machine learning model, and/or a decision tree model. More specifically, in one or more embodiments, an identity resolution model can determine user identities by resolving user identities based on predicted user identities received from one or more digital content providers. In some embodiments, the identity resolution model can be generated based on the prediction accuracy scores of digital content providers in the universal measurement identification system 106. For instance, in one or more embodiments, the identity resolution model can determine prediction accuracy scores of a digital content provider based on the type of user data elements provided to the digital content provider. Furthermore, the universal measurement identification system 106 can utilize the identity resolution model for any user identity prediction received from the digital content providers by referencing the identity resolution model to associate the user identity prediction with a prediction accuracy score from the identity resolution model.

In some embodiments, the universal measurement identification system 106 utilizes the prediction accuracy scores to generate an identity resolution model. For example, the universal measurement identification system 106 can evaluate one or more digital content provider systems 102 and generate prediction accuracy scores for each provider system based on the received predicted user identities 206. In one or more embodiments, the universal measurement identification system 106 can generate an identity resolution model 210 by generating a data table comprising the prediction accuracy scores for each provider system.

To illustrate, for the name "Johnny Miller" from above, the universal measurement identification system 106 can generate an identity resolution model 210 for the first digital content provider system 102*a* and a second digital content provider system 102*b*. As mentioned above, the universal measurement identification system 106 can determine that the first digital content provider system 102*a* has a prediction accuracy score of 0 percent based on the predicted IP address 192.168.1.222 and the second digital content provider system 102*b* has a prediction accuracy score of 100% based on the predicted IP address 192.168.1.32. As a result, the universal measurement identification system 106 can generate an identity resolution model that designates the second digital content provider system 102*b* to be the most accurate user identity predictor and the first digital content provider system 102*a* to be less accurate. Thus, the universal measurement identification system 106 can determine to utilize the user identity predictions of the second digital content provider system 102*b* over the first digital content provider system 102*a* in subsequent requests to identify users.

Additionally, in some embodiments, the universal measurement identification system 106 can generate an identity resolution model based 210 on specific combinations of user data elements and/or types of user identity predictions. For instance, the universal measurement identification system 106 can generate an identity resolution model 210 that provides a variable prediction accuracy score for a provider system 102 based on the one or more received types of predicted user identities (i.e., a prediction of an IP address, a prediction of an IP address and phone number, and/or a prediction of an email address). Furthermore, the universal measurement identification system 106 can generate an identity resolution model that provides a variable prediction accuracy score for a provider system 102 based on the one or more combinations of data elements provided 204 to the provider system 102 during a request for a user identity prediction. For example, the universal measurement identification system 106 can generate an identity resolution model 210 that determines a prediction accuracy score of 100% for the second digital content provider system 102*b* when the requested user identity is an IP address and the provided data elements is a phone number. Additionally, the universal measurement identification system 106 can generate the identity resolution model 210 to also determine a prediction accuracy score of 15% for the second digital content provider system 102*b* when the requested user identity is first name and a last name and the provided data element is an IP address.

In one or more embodiments, the universal measurement identification system 106 can utilize other types of structures such as a machine learning model to generate and/or improve an identity resolution model 210. An illustration of the universal measurement identification system 106 utilizing a machine learning model to generate and/or improve an identity resolution model is discussed in FIG. 3.

Moreover, the universal measurement identification system 106 can generate an identity resolution model 210 in various capacities. For instance, the universal measurement identification system 106 can generate a separate identity resolution model for each digital content provider (i.e., digital content provider systems 102). Furthermore, the universal measurement identification system 106 can generate one identity resolution model that comprises information for all of the digital content providers on the system. In some embodiments, an identity resolution model can comprise of various combinations of provided user data elements and requested user identity predictions for one or more digital content providers to generate an identity resolution model capable of producing variable prediction accuracy scores. Likewise, the universal measurement identification system 106 can generate a separate identity resolution model for each combination of provided user data elements and requested user identity predictions. Additionally, the universal measurement identification system 106 can implement the one or more generated identity resolution models on the intermediate data server and/or on the storage system of a digital content provider.

Indeed, the universal measurement identification system 106 can provide the one or more identity resolution models 212 to the digital content provider systems 102. For example, as shown in FIG. 2A, the universal measurement identification system 106 provides the identity resolution model 212 to both the first digital content provider system 102a and the second digital content provider system 102b after generating the identity resolution model 210. In some embodiments, the universal measurement identification system 106 provides the identity resolution model to the digital content providers 102 to receive and utilize the prediction accuracy score associated to the user identity prediction for the digital content provider to select the most accurate user identity prediction from one or more user identity predictions from digital content providers. For instance, the digital content provider systems 102 can utilize the identity resolution model to associate user identity predictions with a prediction accuracy scores by referencing the identity resolution model before sending the user identity predictions to the universal measurement identification system 106.

In some embodiments, the identity resolution model can provide other values, parameters, and/or weights to digital content provider systems 102 and the prediction accuracy score associated with the digital content provider systems 102. For example, the identity resolution model can provide other factors that influence the final determination by an identity resolution model such as, but not limited to, the time, the age of a provider system, and/or technical reports (i.e., recent cyber-attacks on a provider system, loss of data, planned maintenance). Furthermore, in some embodiments, the universal measurement identification system 106 can update the prediction accuracy scores and/or the generated one or more identity resolution models dynamically, when more data is provided to the universal measurement identification system 106 from the digital content providers. For instance, the universal measurement identification system 106 can update the prediction accuracy scores and/or the generated one or more identity resolution models when another evaluation is made of the digital content provider systems 102 with an updated ground truth data set.

In addition to generating a ground truth data set of known users to evaluate digital content provider systems 102 to generate an identity resolution model 210 and providing the identity resolution model 212 to the digital content providers 102, the universal measurement identification system 106 can utilize information received based on the identity resolution model to determine identifiers for unknown users (and known users) and also utilize the determined identifiers to perform aggregated analytics tasks for users across multiple digital content providers. For instance, FIG. 2B illustrates the universal measurement identification system 106 utilizing the generated identity resolution models to determine identifiers for unknown users 216 and generating insights based on aggregated analytics data 224 for the users from the provider systems. As shown in FIG. 2B, the universal measurement identification system 106 provides one or more data elements of unknown users to the first digital content provider system 102a and the second digital content provider system 102b to utilize identity resolution model on predicted user identities 216a and 216b and receive predicted user identities for the unknown users 218. Moreover, as illustrated in FIG. 2B, the universal measurement identification system 106 utilizes the received predicted user identities for the unknown users 218 and prediction accuracy scores from the identity resolution models 216 to determine identifiers for the unknown users 220. Additionally, as shown in FIG. 2B, the universal measurement identification system 102 receives analytics data for users 222 from the digital content provider systems 102 to generate insights based on aggregated analytics data 224. As discussed above, the universal measurement identification system 106 can provide data elements, utilize the resolution identity model, receive predicted user identities, receive analytics data, and/or generate insights based on aggregated analytics data on an intermediate data environment to safeguard the privacy of individual users.

In some embodiments, the universal measurement identification system 106 provides one or more data elements for unknown users 214 to the digital content provider systems 102. For example, the one or more data elements for unknown users can include, but is not limited to, data elements that are received from digital content providers and/or internally collected by the universal measurement identification system 106. Moreover, as used herein, the term "unknown user" refers to a user not capable of digital identification with a level of certainty by a system. In particular, the term "unknown user" refers to a user that has not been identified by a network with a rate of accuracy that exceeds a threshold accuracy rate established by the network. For instance, a user may access a retailer website and only provide the retailer with an email address (i.e., a single data element). The retailer website, in one or more embodiments, categorizes the user as an unknown user because the retailer website may establish that the retailer website cannot determine the user identity of the user with a high rate of accuracy. Similarly, a network can categorize a data element as belonging to an unknown user. For instance, a network can determine that a data element does not match with an user with a rate of accuracy that exceeds a threshold accuracy rate established by the network and can categorize the data element as belonging to an unknown user.

Additionally, the universal measurement identification system 106 can provide the one or more data elements for unknown users 214, as described in FIG. 2A (providing one or more data elements from the ground truth data set of known users 204 to the first digital content provider system 102a and the second digital content provider system 102b). For instance, the universal measurement identification system 106 can provide the one or more data elements for unknown users 214 to any number of digital content providers, can provide any number of data elements for any number of unknown users to the one or more digital content providers, can provide select data elements to the digital content provider systems 102, and/or can request the digital content provider systems 102, exclusively, utilize the provided data elements when performing predictions of user identities.

Moreover, the universal measurement identification system 106 can also provide the one or more data elements for the unknown users 214 with various types of requests for a predicted user identity as discussed in FIG. 2A. Likewise, the universal measurement identification system 106 can also request the digital content provider systems 102 to provide a label and/or ID associated with the predicted user identity, matching the provided data elements, in the databases of the digital content provider systems 102. Furthermore, the universal measurement identification system 106 can request user identity predictions for known users and/or unknown users based on the provided one or more data elements. Moreover, as in FIG. 2A, the universal measurement identification system 106 can also track the combination of data elements and requests for user identity data elements provided to the digital content provider systems 102.

To illustrate, the universal measurement identification system 106 can receive user data elements such as the phone numbers "111-222-5555" and "111-222-7777." Furthermore, the universal measurement identification system 106 can establish that the received phone numbers do not match and/or associate with any user in the system. Additionally, the universal measurement identification system 106 can provide the phone numbers "111-222-5555" and "111-222-7777" to the first digital content provider system 102*a* and the second digital content provider system 102*b* with a request for an IP address and the provider system ID associated with the phone numbers.

As shown in FIG. 2B, after the universal measurement identification system 106 provides one or more data elements for the unknown users 214 to the digital content provider systems 102, the universal measurement identification system 106 receives predicted user identities for unknown users 218 from the digital content provider systems 102. For instance, the universal measurement identification system 106 can receive predicted user identities for the unknown users 218 as described in FIG. 2A (receive predicted user identities in response to the provided one or more data elements 206). Indeed, the digital content provider systems 102 can predict user identities (as requested) for the data elements provided by universal measurement identification system 106 as described in FIG. 2A. Moreover, the universal measurement identification system 106 can also receive an ID tag utilized by each provider system to identify the user corresponding to the one or more provided data elements as described in FIG. 2A. Furthermore, the universal measurement identification system 106 can receive accuracy prediction scores associated with the predicted user identities that are determined by the digital content provider systems 102 by utilizing the identity resolution model on the predicted user identities 216.

Indeed, as shown in FIG. 2B, the digital content provider systems can utilize the identity resolution model on the predicted user identities 216 to generate accuracy prediction scores associated with the predicted user identities. For example, the digital content provider system 102*a* can predict user identities based on the one or more data elements for the unknown users and also utilize an identity resolution model on the predicted user identities 216*a* to associate accuracy prediction scores to the predicted user identities. In one or more embodiments, the digital content provider system 102*a* references the identity resolution model to determine the prediction accuracy score for the digital content provider system 102*a* and associates the prediction accuracy score to the predicted user identities.

In some embodiments, the digital content provider system 102*a* can provide a description of what types of data elements a predicted user identity was based upon (i.e., providing a list of types of data elements and/or activating flags for types of data elements utilized). As discussed in FIG. 2A, the universal measurement identification system 106 can generate more than one identity resolution model. For example, the universal measurement identification system 106 can provide an identity resolution model to the digital content providers 102 that is specifically generated for a certain combination of provided data elements. As a result, the first digital content provider 102*a* can utilize a specific identity resolution model on predicted user identities 216*a* based on the combination of provided data elements to associate a prediction accuracy score with the predicted user identities.

To illustrate, continuing the example from above, the digital content provider systems 102 can predict a user identity for the phone numbers "111-222-5555" and "111-222-7777." For example, the first digital content provider system 102*a* can predict an IP address 192.1.1.1 and a first digital content provider system 102*a* ID "9B" for the phone number "111-222-5555." Additionally, the first digital content provider system 102*a* can predict an IP address 192.1.13.13 and a first digital content provider system 102*a* ID "93U" for the phone number "111-222-7777." Moreover, the first digital content provider system 102*a* can reference the identity resolution model to determine the prediction accuracy score for the first digital content provider 102*a* when the first digital content provider 102*a* utilizes only phone numbers. As illustrated in FIG. 2A, the first digital content provider system 102*a* has a prediction accuracy score of 0 percent from provided phone numbers.

Similarly, the second digital content provider system 102*b* can predict an IP address 192.1.1.1 and a second digital content provider system 102*b* ID "8763" for the phone number "111-222-5555." Additionally, the second digital content provider system 102*b* can predict an IP address 192.17.1.14 and a second digital content provider system 102*b* ID "8111" for the phone number "111-222-7777." Furthermore, the second digital content provider system 102*b* can reference the identity resolution model to determine the prediction accuracy score for the second digital content provider system 102*b* when the second digital content provider system 102*b* utilizes only phone numbers. As illustrated in FIG. 2A, the second digital content provider system 102*b* has a prediction accuracy score of 100 percent from provided phone numbers.

Furthermore, as shown in FIG. 2B, the universal measurement identification system 106 can receive the predicted user identities for the unknown users 218 from the digital content provider systems 102. In particular, the universal measurement identification system 106 can receive the predicted user identities for the unknown users 218 with an accuracy prediction score from the digital content provider systems 102. Additionally, as mentioned above, the identity resolution models and data utilized to predict user identities by a digital content provider can be implemented on the intermediate data environment to safeguard the privacy of individual users for each digital content provider.

Additionally, the universal measurement identification system 106 can utilize the received predicted user identities for the unknown users 218 to generate resolved user identities. For instance, the universal measurement identification system 106 can utilize the received predicted user identities for the unknown users 218 and the accuracy prediction scores from the digital content provider systems 102 to select one of the predicted user identities as the resolved user identity from the predicted user identities from the digital content provider systems 102. For example, the universal measurement identification system 106 can select the predicted user identity associated with the digital content provider with the highest prediction accuracy score.

To illustrate, continuing the example from above, the universal measurement identification system 106 can determine a resolved user identity for the phone numbers "111-222-5555" and "111-222-7777." For instance, the first digital content provider system 102*a* provided a prediction accuracy score of 0 percent and the second digital content provider system 102*b* provided a prediction accuracy score of 100 percent. As a result, the universal measurement identification system 106 can select the predicted user identities provided by the second digital content provider system 102b as the resolved user identities because the second digital content provider system 102b has a higher prediction accuracy score.

Furthermore, in one or more embodiments, the universal measurement identification system 106 can utilize an identity resolution model after the universal measurement identification system 106 receives predicted user identities for the unknown users from the digital content provider systems 102 (i.e., instead of utilizing the identity resolution model on the digital content provider systems 102). For instance, in some embodiments, the universal measurement identification system 106 utilizes an identity resolution model on predicted user identities received from the digital content provider systems 102. For example, in some embodiments, the universal measurement identification system 106 utilizes the identity resolution model on predicted user identities from the digital content provider systems 102 in order to match the user identities for all of the digital content providers to the most accurate user identity. In some embodiments, the universal measurement identification system 106 can utilize an identity resolution model on the predicted user identities by providing the predicted user identities to the identity resolution model and receiving the most accurate predicted user identity from the identity resolution model.

In one or more embodiments, the universal measurement identification system 106 can provide one or more predicted user identities from the digital content provider systems 102 to an identity resolution model. For example, the universal measurement identification system 106 can provide one or more predicted user identities with a tag signifying which provider system predicted the user identity. Furthermore, the universal measurement identification system 106 can also provide a description of what types of data elements the predicted user identity was based upon (i.e., providing a list of types of data elements and/or activating flags for types of data elements utilized). As discussed in FIG. 2A, the universal measurement identification system 106 can utilize more than one identity resolution model. For instance, the universal measurement identification system 106 can provide predicted user identities and corresponding digital content provider tags to an identity resolution model that is specifically generated for a certain combination of provided data elements. Likewise, the universal measurement identification system 106 can provide a predicted user identity to each corresponding identity resolution models that are specific to each digital content provider on the universal measurement identification system 106.

After providing the predicted user identities to an identity resolution model, the universal measurement identification system 106 can also receive a resolved user identity from the identity resolution model (i.e., the most accurate predicted user identity). For example, the identity resolution model can utilize the prediction accuracy scores for each digital content provider, as generated in FIG. 2A, to resolve a user identity from the one or more predicted user identities from the one or more digital content provider systems 102. For example, the identity resolution model can select the predicted user identity associated with the digital content provider with the highest prediction accuracy score as the resolved user identity.

Furthermore, in some embodiments, the identity resolution model can make a determination utilizing more complex systems and/or factors such as machine learning models to adjust prediction accuracy scores and/or weights as discussed in FIG. 2A and below in FIG. 3. Additionally, as discussed in FIG. 2A, the universal measurement identification system 106 can configure the one or more identity resolution models to determine a resolved user identity based on the type of data elements utilized for the predictions and/or the type of data elements predicted by the digital content providers (i.e., utilizing a variable prediction accuracy score). For example, an identity resolution model can determine that predicted phone numbers are more accurate from the first digital content provider system 102a when the predicted phone numbers are based on IP addresses, whereas predicted phone numbers are more accurate from the second digital content provider system 102b when the predicted phone numbers are based on residential addresses.

To illustrate, continuing the example from above, the universal measurement identification system 106 can provide the received user identity predictions from the first digital content provider system 102a and the second digital content provider system 102b for the phone numbers "111-222-5555" and "111-222-7777" to an identity resolution model to resolve a user identity for each phone number instead of utilizing the identity resolution model on the digital content provider systems 102. For example, as illustrated in FIG. 2A, the universal measurement identification system 106 can utilize the identity resolution model generated for the digital content provider systems 102 in which the first digital content provider system 102a has a prediction accuracy score of 0 percent and the second digital content provider system 102b has a prediction accuracy score of 100 percent for predicting IP addresses from provided phone numbers. As a result, the identity resolution model can determine that the second digital content provider system 102b is more accurate for predicting IP addresses from provided phone numbers. Furthermore, the universal measurement identification system 106 can receive IP address "192.1.1.1" for phone number "111-222-5555" and IP address "192.17.1.14" for phone number "111-222-7777" (the predicted IP addresses from the second digital content provider system 102b) as the resolved user identities from the identity resolution model.

Additionally, the universal measurement identification system 106 can determine identifiers for the unknown users (and known users) 220. In some embodiments, the universal measurement identification system 106 can create a universal measurement ID ("UMID") data table for the one or more digital content provider systems 102 comprising identifiers for the one or more users. For instance, the universal measurement identification system 106 can create a UMID data table and associates user data from the one or more provider systems to a UMID (identifier) for the one or more users. In one or more embodiments, the universal measurement identification system 106 can append the user data from the one or more digital content provider systems 102 to a UMID data table. Furthermore, the universal measurement identification system 106 can also associate the determined identifier with a resolved user identity.

In some embodiments, the universal measurement identification system 106 creates a UMID data table for the one or more digital content provider systems 102 comprising universal identifiers for the one or more users. For example, the UMID data table can comprise one or more data elements associated with a universal identifier. Furthermore, the UMID data table can also comprise of data elements from one or more digital content provider. For example, in some embodiments, the universal measurement identification system 106 appends user data elements and user data IDs from the one or more digital content provider systems 102 into a single row in the UMID data table for a user identifier.

In some embodiments, the universal measurement identification system 106 can append user data elements and user data IDs from the one or more digital content provider systems 102 based on a resolved user identity. For example, the universal measurement identification system 106 can provide a resolved user identity after receiving predicted user identities for the unknown user 218 and determine a universal identifier for the resolved user identity 220. In some embodiments, the universal measurement identification system 106 can receive a resolved user identity from an identity resolution model. In one or more embodiments the universal measurement identification system 106 creates a data table row for the resolved user identity and the universal identifier. Moreover, the universal measurement identification system 106 can append one or more predicted user identities and/or the digital content provider IDs corresponding to the predicted user identities from the one or more digital content provider systems 102 to the data table row with the resolved user identity and the universal identifier. Additionally, the universal measurement identification system 106 can append the one or more user data IDs provided by the one or more digital content providers as part of the predicted user identity to the UMID data table with an association to the resolved user identity and universal identifier.

By assigning a universal identifier to the resolved user identity, the universal measurement identification system 106 can match user data elements across one or more digital content provider systems with accuracy. For example, even though one or more digital content provider systems 102 can provide an incorrect predicted user identity based on provided data elements, the universal measurement identification system 106 can resolve the incorrect predicted user identity to the resolved user identity and the universal identifier for the resolved user identity. As a result, the universal measurement identification system 106 can associate any subsequent data from the one or more digital content providers to the resolved user identity and universal identifier in order to create a reliable user identity match across the one or more digital content providers.

Additionally, some digital content providers (i.e., open web digital content providers) do not maintain user identity data and, therefore, cannot identify users based on data elements available to those digital content providers and also cannot match users across one or more digital content providers. The universal measurement identification system 106 can associate the data elements available to those digital content providers to the resolved user identities and the universal identifiers in order to match user data elements from those digital content providers to the one or more other digital content providers on the universal measurement identification system 106.

Furthermore, in one or more embodiments, the universal measurement identification system 106 can create an UMID data table for specific user identities. For example, the universal measurement identification system 106 can create a UMID data table that matches IP addresses between one or more digital content providers and the user data IDs for the one or more digital content providers associated with the IP addresses. Similarly, the universal measurement identification system 106 can create a UMID data table that matches device IDs between one or more digital content providers and the user data IDs for the one or more digital content providers associated with the device IDs.

Furthermore, in some embodiments, the universal measurement identification system 106 can utilize other data management systems to assign a universal identifier to the one or more user identities from the one or more digital content provider systems 102. For instance, the universal measurement identification system 106 can provide the universal identifier to one or more data tables corresponding to the one or more digital content providers and associate the matching resolved user identity in the data table of one or more digital content providers to the universal identifier. Furthermore, the one or more data tables corresponding to the one or more digital content provider systems 102 can be implemented in the intermediate data environment.

To illustrate, continuing the example from above, the universal measurement identification system 106 can determine a universal identifier for the resolved user identities for the phone numbers "111-222-5555" and "111-222-7777." For example, the universal measurement identification system 106 can create a UMID data table row with a universal identifier of "1" and associate this row with the resolved user identity from the second digital content provider system 102b (an IP address "192.1.1.1" for phone number "111-222-5555"). Furthermore, the universal measurement identification system 106 can create a UMID data table row with a universal identifier of "2" and associate this row with the resolved user identity form the second digital content provider system 102b (an IP address "192.17.1.14" for phone number "111-222-7777"). Furthermore, the universal measurement identification system 106 can associate universal identifier "1" with the ID "8763" from the second digital content provider system 102b and with the ID "9B" from the first digital content provider system 102a. Similarly, the universal measurement identification system 106 can associated universal identifier "2" with the ID "8111" from the second digital content provider system 102b and with the ID "93U" from the first digital content provider system 102a. Likewise the universal measurement identification system 106 can also associate other predicted user identity data from the digital content providers 102 to the respective universal identifiers.

As shown in FIG. 2B, the universal measurement identification system 106 can receive analytics data for users 222 from the digital content provider systems 102. As used herein, the term "analytics data" refers to information available in digital format that can be utilized to analyze online activity. In particular, the term "analytics data" refers to collected digital data that can be utilized to analyze online activity of users to impart insight on how users behave. More specifically, in some embodiments, analytics data includes all collected digital data that can be analyzed to impart insights such as, but not limited to, trends, user action predictions, and/or marketing placement. For instance, in some embodiments, analytics data includes, but is not limited to, session times of users, purchases made by users, gender, age, shopping preferences, browser type, and/or device type. Furthermore, in some embodiments, analytics data includes user data elements when they are relevant to analytical insights. In some embodiments, the analytics data can also already be available on the universal measurement identification system 106. Moreover, the received analytics data for users 222 can be stored in the intermediate data environment to safeguard the privacy of users between the digital content providers.

In addition to receiving analytics data for users 222 from the digital content provider systems 102, the universal measurement identification system 106 can also receive user data elements associated with the analytics data. For instance, the digital content provider systems 102 can provide user data elements associated with the analytics data (i.e., a phone number, an IP address, and/or the user data ID on the digital content provider system).

To illustrate, continuing the example from above, the universal measurement identification system 106 can receive analytics data such as the number of purchases by a user and number of advertisement views by a user. For example, the first digital content provider system 102a can provide that the user associated with phone number "111-222-5555" on first digital content provider system 102a purchased five items. Furthermore, the second digital content provider system 102b can provide that the user associated with ID "8763" on the second digital content provider system 102b viewed zero advertisements. The universal measurement identification system 106 can associate the five purchased items from the first digital content provider system 102a to universal identifier "1" and the zero advertisement views from the second digital content provider system 102b to universal identifier "1".

Furthermore, the universal measurement identification system can receive analytics data from a third digital content provider system (or more digital content provider systems) that informs the universal measurement identification system 106 that a user with an IP address of "192.1.1.1" (the resolved user identity for universal identifier "1") viewed three advertisements. The universal measurement identification system 106 can associate this analytics data with universal identifier "1".

Additionally, as shown in FIG. 2B, the universal measurement identification system 106 can perform aggregated analytics tasks to generate insights based on aggregated analytics data 224 from the one or more digital content provider systems 102. As used herein, the term "aggregated analytic tasks" refers to actions utilizing a grouping of data to gain insights from the grouping of data. In particular, the term "aggregated analytic tasks" refers to actions on a collection of analytics data to generate statistical or analytical insights from the collection of analytics data such as, but not limited to, trends, lift measurements, user action predictions, and/or marketing placement. For instance, in some embodiments, aggregated analytics tasks can include determining how many users purchase a specific product based on the gender, age, and geographical location of all the users. Furthermore, in some embodiments, the aggregated analytics tasks includes an analysis of user analytics data without any identifying user data elements. For example, an aggregated analytics task can include, but is not limited to, calculating the number of item purchases that are attributed to advertisement views.

In one or more embodiments, the universal measurement identification system 106 provides the generated insights based on aggregated analytics data 224 to the one or more digital content providers. For instance, the universal measurement identification system 106 can generate insights based on aggregated analytics data 224 specifically for an individual digital content provider utilizing the analytics data available for one or more user identities with a universal identifier. Furthermore, in some embodiments, the universal measurement identification system 106 can provide generated insights specifically related to one or more digital content provider systems 102 based on matching universal identifiers and analytics data provided to those universal identifiers. The universal measurement identification system 106 can provide such insights without sharing user data elements between the one or more digital content provider systems 102.

To illustrate, continuing the example from above, the universal measurement identification system 106 can utilize the analytics data provided for universal identifier "1" and generate insights for the first digital content provider system 102a. For instance, the universal measurement identification system 106 can establish that the user identity associated with universal identifier "1" has purchased five items and has viewed three advertisements, collectively from all other digital content provider systems 102. Similarly, the universal measurement identification system 106 can collect similar analytics data for other universal identifiers for user identities amongst the three digital content provider systems. Furthermore, utilizing the collected analytics data, the universal measurement identification system 106 can generate an insight such as how many user identities associated with universal identifiers have purchased items after viewing one or more advertisements on any digital content provider system.

Indeed, the universal measurement identification system 106 can accurately determine that a user that viewed an advertisement on the second or third digital content provider system is the same user that purchased an item on the first digital content provider system without sharing user data elements between the three digital content provider systems because the three digital content provider systems provided analytics data associated to the same universal identifier. By matching the three digital content providers to a resolved user identity with a universal identifier, the universal measurement identification system 106 can establish that the received analytics data utilized to perform aggregated analytics tasks are based on matched user identities from the TIMID data table and, therefore, the universal measurement identification system 106 can provide a more accurate generated insight for the digital content provider systems.

As mentioned above, the universal measurement identification system 106 can utilize various types of structures to generate and/or improve an identity resolution model. For example, as shown in FIG. 3, the universal measurement identification system 106 utilizes a machine learning model to generate and/or improve an identity resolution model. As used herein, a "machine learning model" refers to a computer representation that can be tuned (e.g., trained) based on inputs to approximate unknown functions. In particular, the term "machine learning model" can include a model that utilizes algorithms to learn from, and make predictions on, known data by analyzing the known data to learn to generate outputs that reflect patterns and attributes of the known data. For instance, a machine learning model can include but is not limited to a neural network (e.g., a convolutional neural network or deep learning), decision tree, association rule learning, inductive logic programming, support vector learning, Bayesian network, regression-based model, principal component analysis, and/or a combination thereof.

Figure 3:
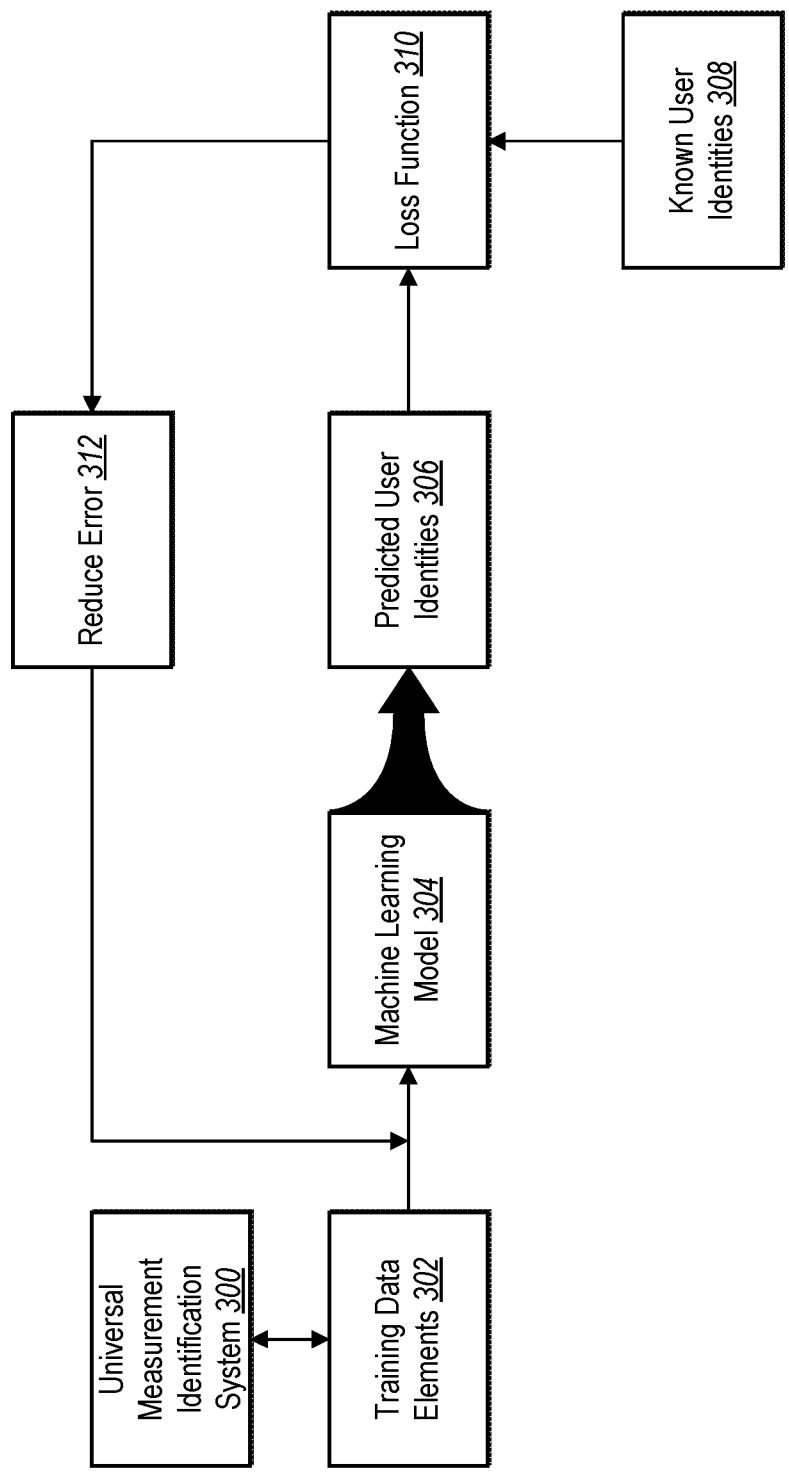
FIG. 3 illustrates an example flow diagram of training a machine learning model in accordance with one or more embodiments.

For example, FIG. 3 illustrates the universal measurement identification system 106 training an identity resolution model as machine learning model 304. For instance, universal measurement identification system 106 can provide training data elements 302 to machine learning model 304 to generate predicted user identities 306. Furthermore, universal measurement identification system 106 can utilize loss function 310 and known user identities 308 to reduce error 312 in the machine learning model 304.

In one or more embodiments, the training data elements 302 include user data elements for known users from a ground truth dataset. Furthermore, the training data elements 302 can correspond to the known user identities 308. In one or more embodiments, the universal measurement identification system 106 provides the training data elements 302 to the machine learning model 304 without the corresponding known user identities 308.

Moreover, the universal measurement identification system 106 utilizes the machine learning model 304 to predict user identities. For example, the machine learning model 304 can be an identity resolution model and comprise of the weights, parameters, and prediction accuracy scores as described in FIG. 2A. For instance, the machine learning model 304 can determine the most accurate user identity for the one or more training data elements 302. Furthermore, in some embodiments, the machine learning model 304 can also determine the most accurate digital content provider for predicting user identities from the one or more training data elements and provide the predicted user identity associated with the determined digital content provider.

In one or more embodiments, the machine learning model 304 generates predicted user identities 306. For example, the predicted user identities 306 can be the predicted user identities corresponding to the user identities associated with the training data elements 302. In some embodiments, the predicted user identities also includes one or more prediction accuracy scores and the determined digital content provider based on the one or more prediction accuracy scores.

Furthermore, the universal measurement identification system 106 can utilize the loss function 310 to compare the predicted user identities 306 with the known user identities 308. In some embodiments, the known user identities can include a determined digital content provider that was predetermined to be the most accurate digital content provider for the provided training data elements 302. For instance, the universal measurement identification system 106 can utilize the loss function 310 to determine the accuracy of the machine learning model 304 and the predicted user identities 306.

Moreover, in some embodiments, the universal measurement identification system 106 provides the results of the loss function 310 to reduce error 312 in the machine learning model 304. For example, the machine learning model 304 can utilize the results of loss function 310 to adjust one or more features of the machine learning model 304 to generate a new set of predicted user identities. In some embodiments, the machine learning model 304 can adjust the weights, parameters, and prediction accuracy scores utilized to determine a predicted user identity based on the results of the loss function 310.

Furthermore, the universal measurement identification system 106 can utilize the machine learning model 304 after adjusting one or more features of the machine learning model 304 to generate a new set of predicted user identities 306. Likewise, the universal measurement identification system 106 can utilize the loss function 310 and the known user identities to determine the accuracy of the predicted user identities 306. Moreover, the universal measurement identification system 106 can provide the results of the loss function 310 to reduce error 312 in the machine learning model 304 again. In some embodiments, the universal measurement identification system 106 can continue to repeat the process of utilizing the loss function 310 on predicted user identities 306 and providing the results of the loss function 310 to the machine learning model 304 to reduce error 312 in the machine learning model 304 until a threshold level of accuracy is reached.

Figure 4A:
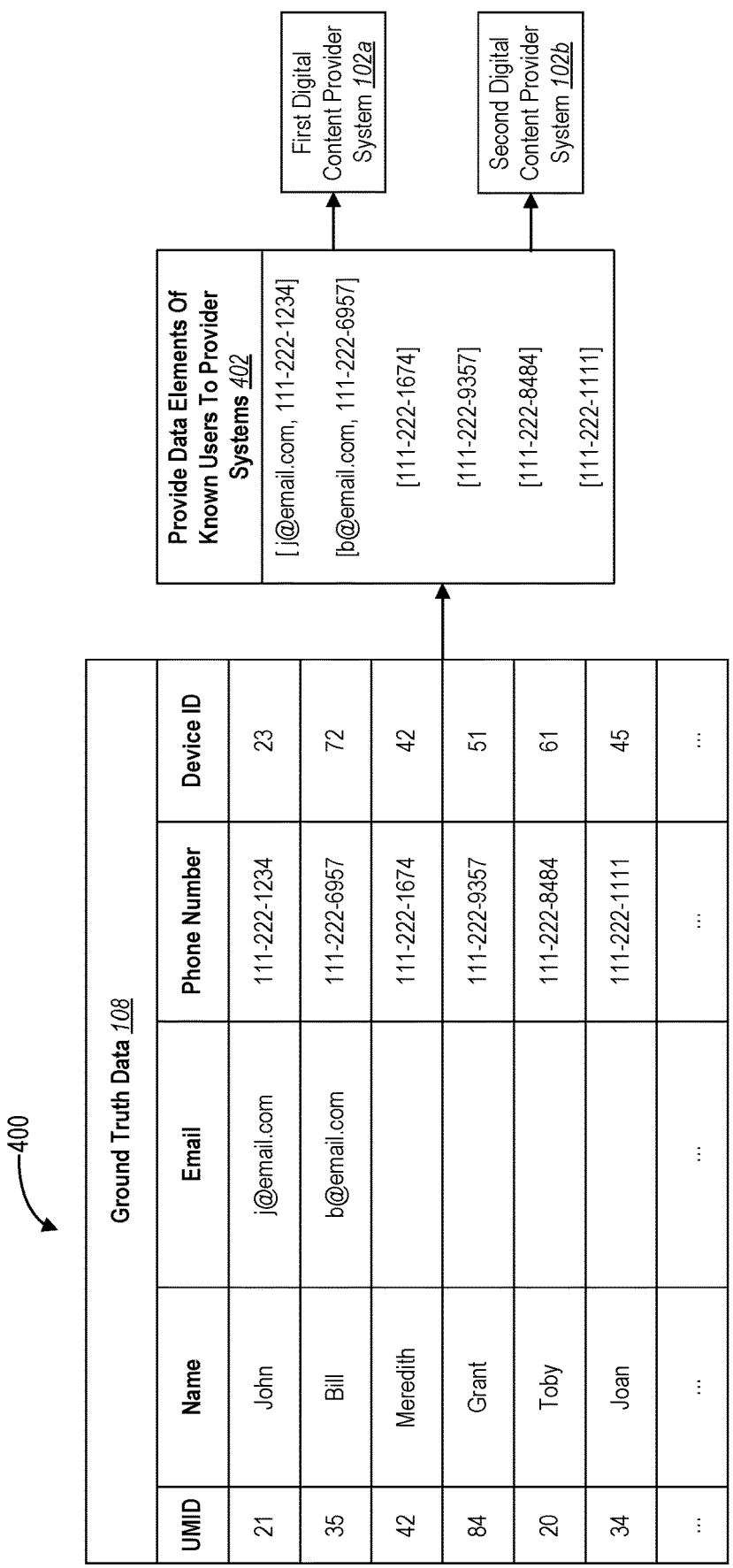
FIG. 4A illustrates an example flow diagram of utilizing a ground truth data set to provide data elements to digital content providers in accordance with one or more embodiments.
Figure 4B:
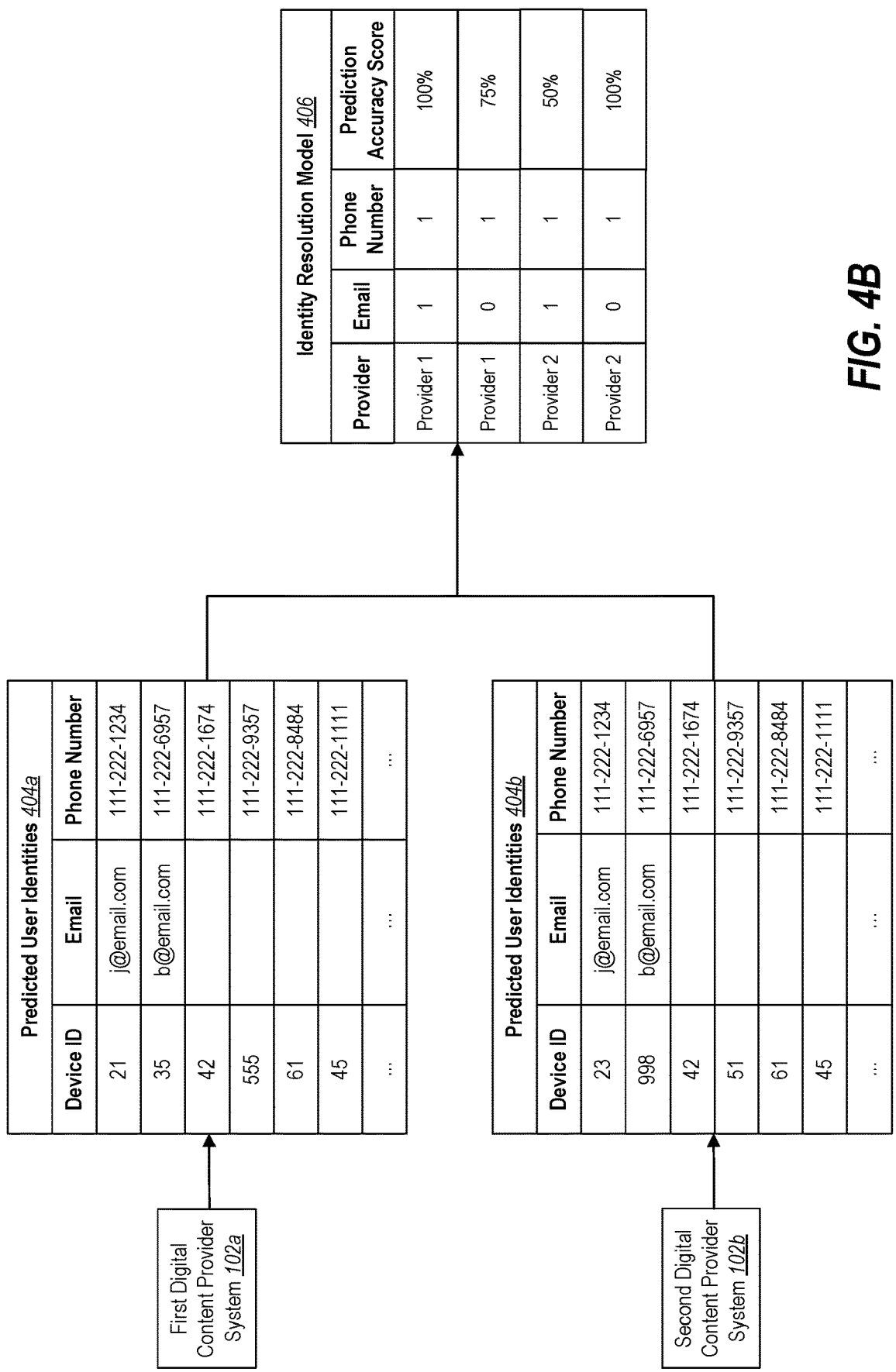
FIG. 4B illustrates an example flow diagram of utilizing predicted user identities to generate an identity resolution model in accordance with one or more embodiments.

As mentioned above, the universal measurement identification system 106 can utilize a ground truth data set of known users to generate an identity resolution model for one or more digital content providers. For instance, FIG. 4 illustrates an exemplary embodiment of the universal measurement identification system 106. For example, as shown in FIG. 4A, the universal measurement identification system 106 can provide data elements from a ground truth data set of known users to one or more digital content providers. Additionally, as shown in FIG. 4B, the universal measurement identification system 106 can utilize predicted user identities from digital content providers to generate an identity resolution model.

More specifically, FIG. 4A illustrates the universal measurement identification system utilizing a ground truth data set 400 to provide data elements of known users to provider systems 402. As shown in FIG. 4A, ground truth data set 400 includes one or more data elements for known users. In particular, ground truth data set 400 includes a UMID (a universal identifier), a name, an email, a phone number, and a device ID corresponding to each known user. For example, ground truth data set 400 includes a data row comprising a known user associated to UMID "21". In particular, UMID "21" includes data elements such as name "John", email "j@email.com," phone number "111-222-1234," and device ID "23."

Moreover, the universal measurement identification system 106 utilizes the ground truth data set 400 to provide data elements of known users to provider systems 402. As discussed in FIG. 2A, the universal measurement identification system 106 can provide various combinations of data elements to the digital content providers. In particular, as shown in FIG. 4A, the universal measurement identification system 106 selects two types of combination of data elements, an email and phone number and only a phone number, to provide to the digital content providers, in order to receive predicted user identities 404a (discussed in FIG. 4B).

For example, universal measurement identification system 106 selects an email "j@email.com" and a phone number "111-222-1234" from UMID "21" to provide to the first digital content provider system 102a and second digital content provider system 102b. Likewise, the universal measurement identification system 106 provides other data elements of known users to the provider systems 402 including the phone numbers "111-222-1674," "111-222-9357," and "111-222-8484." In some embodiments, not shown in FIG. 4A, the universal measurement identification system 106 can also provide a request for a specific type of user identity to the digital content provider systems 102. For instance, for illustration in FIGS. 4A and 4B, the universal measurement identification system 106 requests a device ID from the digital content provider systems 102 as the predicted user identity.

Additionally, the universal measurement identification system 106 can receive predicted user identities from one or more digital content provider systems and can generate an identity resolution model from the predicted user identities. For instance, as shown in FIG. 4B, the universal measurement identification system 106 receives predicted user identities 404a from first digital content provider system 102a and predicted user identities 404b from second digital content provider system 102b. Moreover, the predicted user identities 404a and the predicted user identities 404b are represented as a data table from the digital content provider systems 102. In particular, the predicted user identities 404a and the predicted user identities 404b include the data elements utilized to make a user identity prediction (email and phone number) and the requested predicted user identity (the device ID).

More specifically, as shown in FIG. 4B, the digital content provider systems 102 separately provide predicted user identities based on the provided data elements of known users 402. For example, the first digital content provider system 102a predicts a device ID "21" for email "j@email.com" and phone number "111-222-1234", which is accurate according to ground truth data set 400. Likewise, the first digital content provider system 102a provides an accurate predicted device ID for the other provided data elements according to the ground truth data set 400, except for the phone number "111-222-9357". In particular, the first digital content provider system 102a predicts the device ID "555" for phone number "111-222-9357", when the actual device ID is "51" according to the ground truth data set 400.

Additionally, as shown in FIG. 4B, the second digital content provider system 102b also predicts a device ID "21" for email "j@email.com" and phone number "111-222-1234", which is accurate according to ground truth data set 400. Similarly, the second digital content provider system 102b provides an accurate predicted device ID for the other provided data elements according to the ground truth data set 400, except for the email "b@email.com" and the phone number "111-222-6957". In particular, the first digital content provider system 102a predicts the device ID "998" for the email "b@email.com" and phone number "111-222-6957", when the actual device ID is "72" according to the ground truth data set 400. Moreover, in some embodiments, the digital content provider systems 102 can provide any number of predicted user identities to the universal measurement identification system 106.

In addition to receiving predicted user identities from the digital content provider systems 102, the universal measurement identification system 106 can also generate an identity resolution model. For example, as shown in FIG. 4B, the universal measurement identification system 106 utilizes the predicted user identities from the digital content provider systems 102 to generate identification resolution model 406. In particular, the universal measurement identification system 106 utilizes the predicted user identities 404a from first digital content provider system 102a and the predicted user identities 404b from the second digital content provider system 102b to generate prediction accuracy scores for the digital content provider systems 102.

For example, as shown in FIG. 4B, the universal measurement identification system 106 utilizes the determined prediction accuracy scores for the digital content provider systems 102 and generates identity resolution model 406. In particular, as illustrated in FIG. 4B, the identity resolution model 406 includes information such as the digital content provider, possible data elements utilized in the prediction (i.e., email and phone number), and a prediction accuracy score. Furthermore, the identity resolution model 406 utilizes a binary flag to designate the data elements that were utilized for the calculated prediction accuracy score. For instance, a binary "1" designates that the data element was utilized, whereas the binary "0" designates that the data element was not utilized.

More specifically, as shown in FIG. 4B, the universal measurement identification system 106 determines, from the predicted user identities 404a, that the first digital content provider system 102a was accurate for all predicted device IDs when utilizing an email and phone number. As a result, the universal measurement identification system 106 assigns a prediction accuracy score of 100 percent for "provider 1" when the utilized data elements include an email and phone number in identity resolution model 406. Likewise, the universal measurement identification system 106 determines, from the predicted user identities 404a, that the first digital content provider system 102a accurately predicted three out of four device IDs when utilizing only a phone number. As a result, the universal measurement identification system 106 assigns a prediction accuracy score of 75 percent for "provider 1" when the utilized data elements include only a phone number in identity resolution model 406.

Additionally, as shown in FIG. 4B, the universal measurement identification system 106 determines, from the predicted user identities 404b, that the second digital content provider system 102b was accurate for one out of two predicted device IDs when utilizing an email and phone number. As a result, the universal measurement identification system 106 assigns a prediction accuracy score of 50 percent for "provider 2" when the utilized data elements include an email and phone number in identity resolution model 406. Likewise, the universal measurement identification system 106 determines, from the predicted user identities 404b, that the second digital content provider system 102b accurately predicted all of the device IDs when utilizing only a phone number. As a result, the universal measurement identification system 106 assigns a prediction accuracy score of 100 percent for "provider 2" when the utilized data elements include only a phone number in identity resolution model 406. Furthermore, the universal measurement identification system 106 can provide the identity resolution model 406 to the digital content providers as shown in FIG. 2B.

Figure 5A:
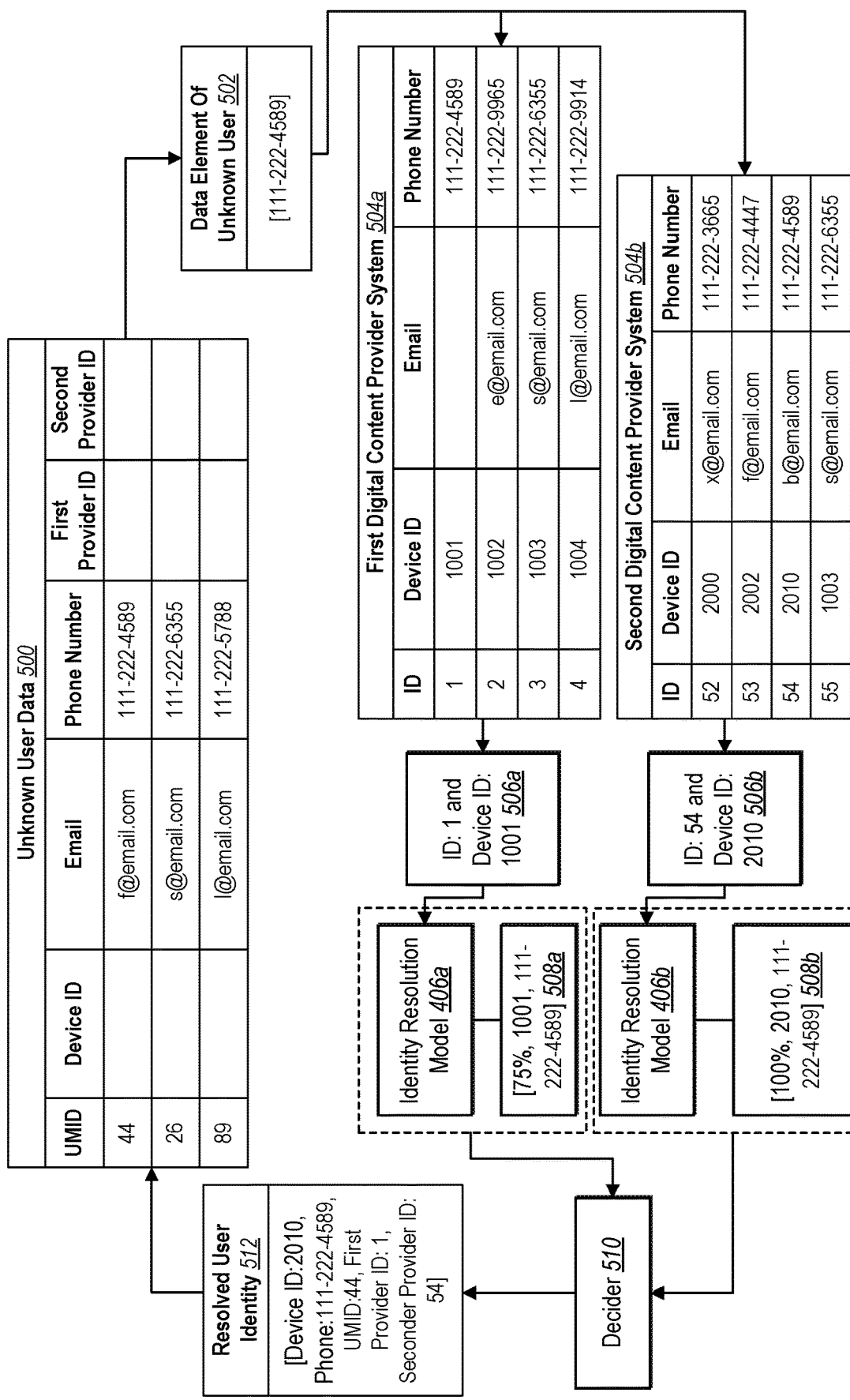
FIG. 5A illustrates an example flow diagram of assigning a universal identifier to a user based on predicted user identities from identity resolution models from the digital content providers in accordance with one or more embodiments.
Figure 5B:
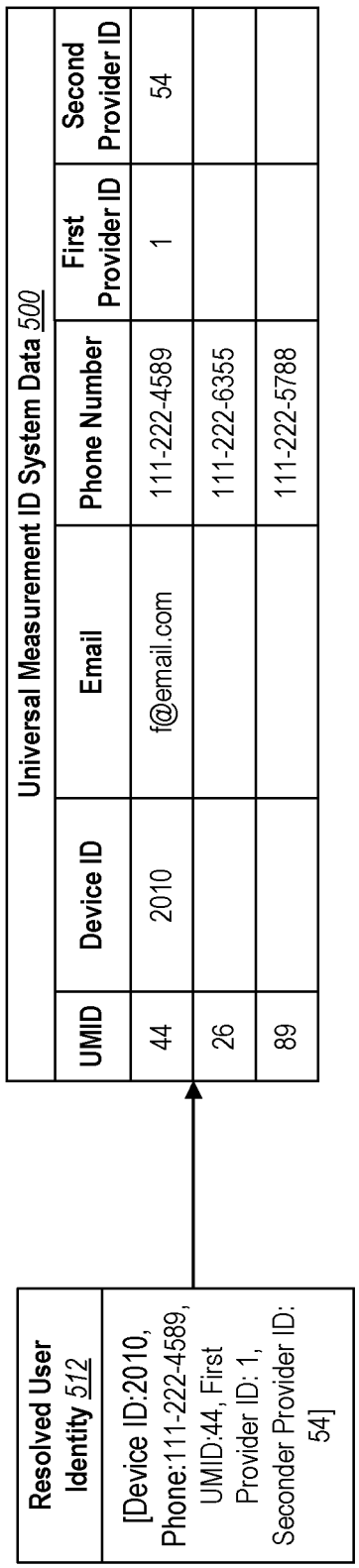
FIG. 5B illustrates an example flow diagram of utilizing a resolved user identity to update the universal measurement identification system data in accordance with one or more embodiments.

In addition to utilizing a ground truth data set to generate an identity resolution model, the universal measurement identification system 106 can also utilize the identity resolution model to resolve identities of users on one or more digital content provider systems. For instance, FIG. 5 illustrates an exemplary embodiment of the universal measurement identification system 106. For example, as illustrated in FIG. 5A, the universal measurement identification system 106 provides data elements of unknown users to one or more digital content provider systems to receive predicted user identities from the one or more digital content provider systems. Moreover, the universal measurement identification system 106 utilizes identity resolution models associated with the digital content provider systems and the predicted user identities to generate a resolved user identity. Additionally, as illustrated in FIG. 5B, the universal measurement identification system provides the generated resolved user identity to a UMID data table.

For example, as illustrated in FIG. 5A, the universal measurement identification system 106 utilizes unknown user data 500. As shown in FIG. 5A, unknown user data 500 includes one or more data elements for unknown users (users without a device ID in this example). In particular, unknown user data 500 includes a UMID (a universal identifier), an email, and a phone number. Furthermore, unknown user data 500 includes a column for a first provider ID, and a second provider ID, and a device ID corresponding to each unknown user. In particular, the first provider ID and the second provider ID correspond to user ID for the predicted user identity in the digital content provider systems 102. For example, unknown user data 500 includes a data row comprising an unknown user associated to UMID "44". In particular, UMID "44" includes data elements such as email "f@email.com" and phone number "111-222-4589."

Moreover, as shown in FIG. 5A, the universal measurement identification system 106 provides a data element of unknown user 502 from the unknown user data 500 to the first digital content provider system 102a corresponding to the first digital content provider system data 504a and a second digital content provider system 102b corresponding to the second digital content provider system data 504b. For example, the universal measurement identification system 106 can provide phone number "111-222-4589" as the data element of unknown user 502 with a request for a device ID and a corresponding user ID ("ID") from the digital content provider systems 102.

Furthermore, the universal measurement identification system 106 can receive a predicted user identity (device ID and the corresponding user ID from the digital content provider systems) from the digital content provider systems 102. For example, first digital content provider system 102a can utilize first digital content provider system data 504a to determine a match for phone number "111-222-4589" 502. As shown in FIG. 5A, first digital content provider system data 504a includes a device ID "1001" and ID "1" for phone number "111-222-4589" and, therefore, first digital content provider system 102a provides device ID "1001" and ID "1" as the predicted user identity 506a to universal measurement identification system 106. Similarly, second digital content provider system 102b can utilize second digital content provider system data 504b to determine a match for phone number "111-222-4589" 502. As shown in FIG. 5A, second digital content provider system data 504b includes a device ID "2010" and ID "54" for phone number "111-222-4589" and, therefore, second digital content provider system 102b provides device ID "2010" and ID "54" as the predicted user identity 506b to universal measurement identification system 106.

After predicting user identities, the digital content provider systems 102 can utilize an identity resolution model to associate accuracy prediction scores with the predicted user identities. Additionally, the universal measurement identification system 106 can utilize the predicted user identities with corresponding accuracy prediction scores to generate a resolved user identity. For example, as shown in FIG. 5A, the universal measurement identification system 106 utilizes the predicted user identities associated with prediction accuracy scores 508 and decider 510 to resolve the user identity for phone number "111-222-4589" 502. As illustrated in FIG. 5A, the identity resolution models 406a and 406b generate a prediction accuracy score for the predicted user identities from the digital content provider systems 102 and utilizes a decider 510 to generate resolved user identity 512.

In particular, the identity resolution model 406a determines a prediction accuracy score of 75 percent for the predicted user identity 506a. More specifically, the identity resolution model 406a references the prediction accuracy score of the first digital content provider system 102a for instances where the predicted user identity is based on a phone number only, and therefore, determines the prediction accuracy score as 75 percent. Furthermore, the universal measurement identification system 106 utilizes the determined prediction accuracy score for predicted user identity 506a to generate identity resolution model output 508a which includes the determined prediction accuracy score of 75 percent, the predicted device ID "1001", and the phone number "111-222-4589" (the data element used for the prediction).

Likewise, as shown in FIG. 5A, the identity resolution model 406b determines a prediction accuracy score of 100 percent for the predicted user identity 506b. In particular, the identity resolution model 406b references the prediction accuracy score of the second digital content provider system 102b for instances where the predicted user identity is based on a phone number only, and therefore, determines the prediction accuracy score as 100 percent. Moreover, the universal measurement identification system 106 utilizes the determined prediction accuracy score for predicted user identity 506b to generate identity resolution model output 508b which includes the determined prediction accuracy score of 100 percent, the predicted device ID "2010", and the phone number "111-222-4589" (the data element used for the prediction).

After receiving the identity resolution model output 508a and the identity resolution model output 508b from the digital content provider systems 102, the universal measurement identification system 106 utilizes the decider 510 to generate a resolved user identity 512. For example, the decider 510 analyzes the identity resolution model output 508a and the identity resolution model output 508b to determine the most accurate device ID prediction from the digital content provider systems 102. In FIG. 5A, the decider 510 selects the identity resolution model output with the highest prediction accuracy score. As a result, the decider 510 selects identity resolution model output 508b, which comprises a prediction accuracy score of 100 percent and corresponds to the second digital content provider system 102b, as the resolved user identity 512. In particular, the decider 510 generates resolved user identity 512 as a data set that includes "2010" as the device ID corresponding to phone number "111-222-4589" and UMID "44". Furthermore, resolved user identity 512 also includes corresponding user IDs from the digital content providers (i.e., First Provider ID "1" and Second Provider ID "54").

In one or more embodiments, the universal measurement identification system 106 integrates the decider 510 into an identity resolution model. For example, the universal measurement identification system 106 can utilize the decider 510 as part of the structure described in FIGS. 2 and 3 in relation to the identity resolution model.

In addition to utilizing an identity resolution model to generate a resolved user identity, the universal measurement identification system 106 can update a UMID data table to include a generated resolved user identity. For example, as shown in FIG. 5B, the universal measurement identification system 106 provides resolved user identity 512 to the universal measurement ID system data 500 (an exemplary UMID data table as discussed in FIG. 2). In particular, the universal measurement identification system 106 updates the user data row for UMID "44" (the UMID for resolved user identity 512) in universal measurement ID system data 500 with the information included in resolved user identity 512. More specifically, the universal measurement identification system 106 updates the user data row for UMID "44" to include device ID "2010," first provider ID "1," and second provider ID "54." In some embodiments, the universal measurement identification system 106 can also append other data elements such as the predicted user identity data elements for each of the digital content providers regardless of accuracy (as discussed in FIG. 2).

Figure 6:
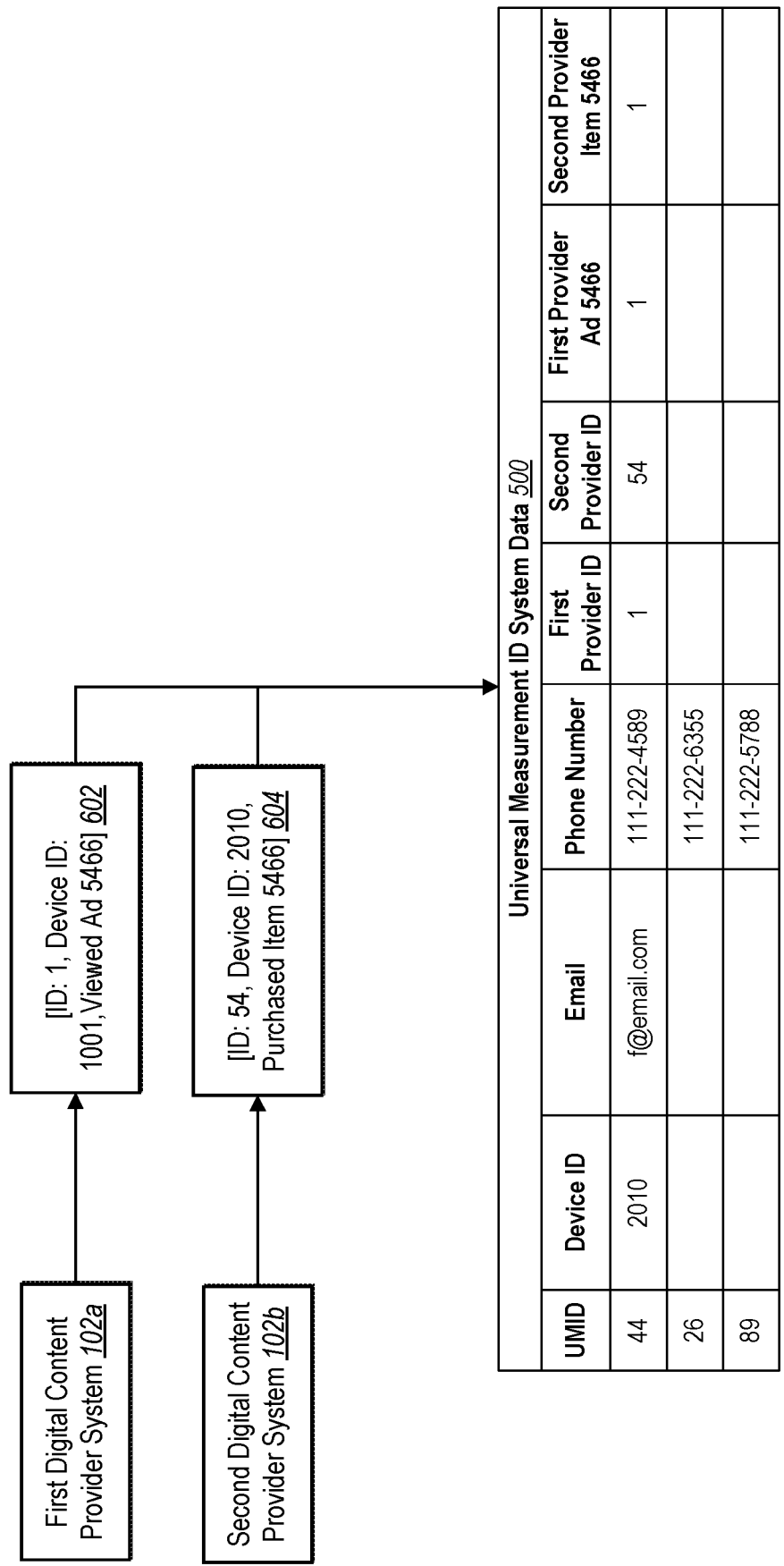
FIG. 6 illustrates an example flow diagram of receiving analytics data from digital content providers in accordance with one or more embodiments.

As just mentioned, the universal measurement identification system 106 can also receive analytics data from the digital content providers. For example, FIG. 6 illustrates the universal measurement identification system 106 receiving analytics data from the first digital content provider system 102a and the second digital content provider system 102b. In particular, universal measurement identification system receives analytics data 602 from the first digital content provider system 102a. More specifically, the analytics data 602 includes information such as a device ID and user ID (First Provider ID) associated with an advertisement view by the user (ad 5466) on the first digital content provider system 102*a*.

Moreover, as shown in FIG. 6, the universal measurement identification system 106 receives analytics data 604 from the second digital content provider system 102*b*. More specifically, the analytics data 604 includes information such as a device ID and user ID (Second Provider ID) associated with a purchased of an item by the user (item 5466) on the second digital content provider system 102*b*.

Additionally, the universal measurement identification system 106 utilizes the analytics data 602 and 604 from the digital content provider systems 102 and updates the universal measurement ID system data 500. For instance, the universal measurement identification system 106 appends new data elements based on the analytics data received by the digital content provider systems 102 (First Provider Ad 5466 and Second Provider Item 5466). Furthermore, in FIGS. 6 and 7, the universal measurement identification system 106 predetermines that Ad 5466 and Item 5466 relate to the same product.

Additionally, the universal measurement identification system 106 utilizes binary flags to represent the state of the newly appended data elements. For example, a value of "1" under First Provider Ad 5466 represents that the associated user has viewed the advertisement on the first digital content provider system 102*a*. Similarly, a value "0" under First Provider Ad 5466 represents that the associated user has not viewed the advertisement on the first digital content provider system 102*a*. Moreover, a value of "1" under Second Provider Item 5466 represents that the associated user has purchased the item on the second digital content provider system 102*b*. Likewise, a value of "0" under Second Provider Item 5466 represents that the associated user has not purchased the item on the second digital content provider system 102*a*.

Figure 7:
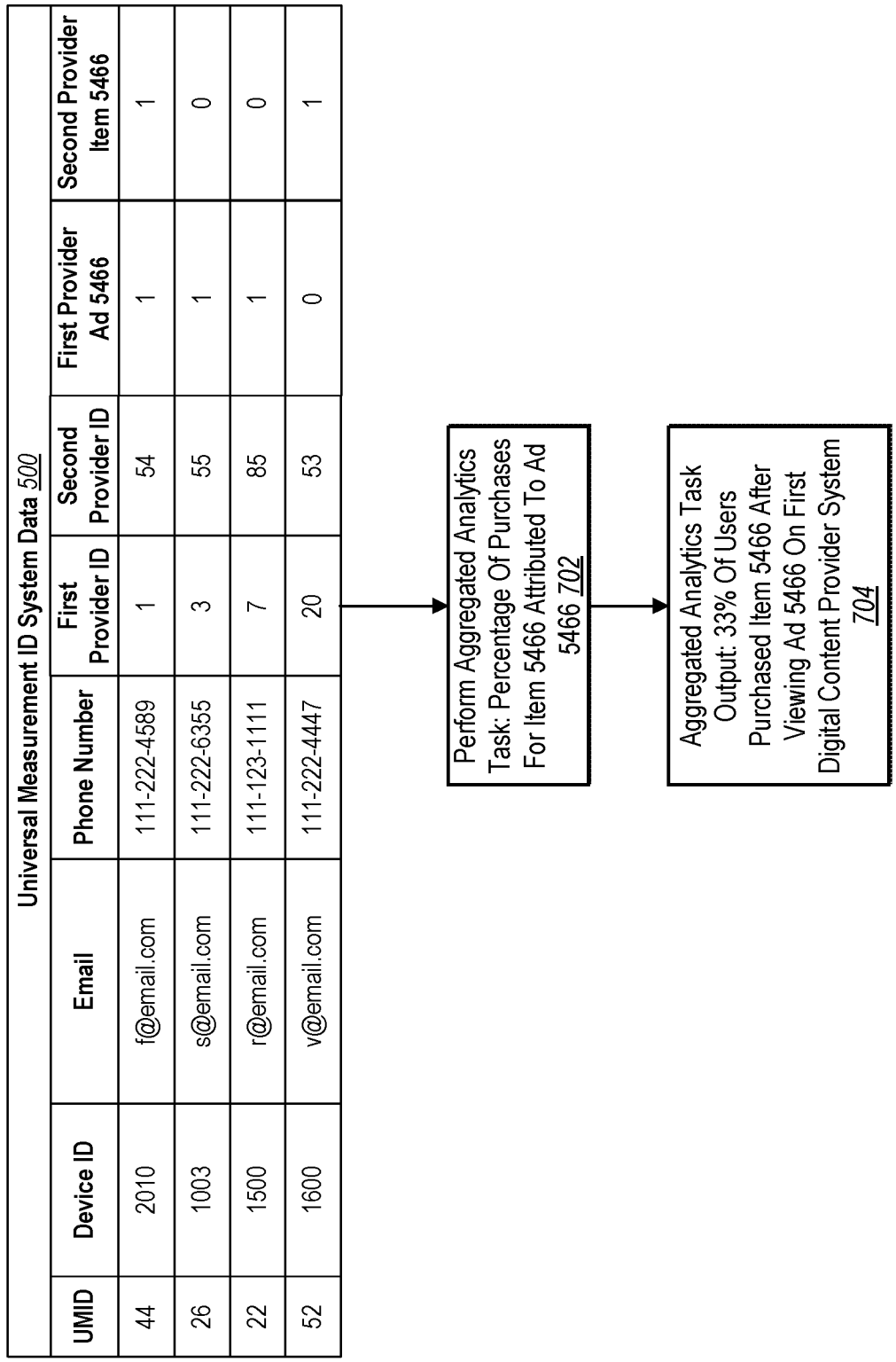
FIG. 7 illustrates an example flow diagram of performing analyses on users in a universal measurement identification system in accordance with one or more embodiments.

In addition to receiving analytics data from the digital content providers, the universal measurement identification system 106 can perform aggregated analytics tasks. For example, FIG. 7 illustrates the universal measurement identification system 106 utilizing the universal measurement ID system data 500 with appended analytics data from the digital content providers 102. For instance, the universal measurement identification system 106 utilizes the universal measurement ID system data 500 to perform aggregated analytics tasks and output an aggregated analytics insight.

In particular, the universal measurement identification system 106 utilizes the universal measurement ID system data 500 to perform aggregated analytics tasks 702. For example the universal measurement identification system 106 can perform the aggregated analytics task of calculating the percentage of purchases for item 5466 on the second digital content provider system 102*b* being attributed to views of advertisement 5466 by users on the first digital content provider system 102*a* 702. In particular, the universal measurement identification system 106 can determine that 3 users, from the universal measurement ID system data 500, have viewed ad 5466 on the first digital content provider system 102*a* (entries with a "1" for First Provider Ad 5466). Furthermore, the universal measurement identification system 106 can determine that 1 user, from the universal measurement ID system data 500, has purchased item 5466 from the second digital content provider system 102*b* after viewing the advertisement 5466 on the first digital content provider system 102*a* (entries with a "1" in both First Provider Ad 5466 and Second Provider Item 5466). Moreover, the universal measurement identification system 106 can divide the number of purchases of item 5466 on the second provider content system 102*b* by the number of advertisements 5466 viewed on the first digital content provider system 102*a* to determine a percentage (i.e., 1 out of 3 users purchased item 5466 after viewing advertisement 5466).

Additionally, after performing the aggregated analytics task 702, the universal measurement identification system 106 can provide the aggregated analytics task output to one or more digital content providers. For example, the universal measurement identification system 106 can provide the aggregated analytics task output (for the performed aggregated analytics task): "33% of users purchased item 5466 after viewing an advertisement for item 5466 on the first provided digital content provider" 704 to one or more digital content providers 102. In some embodiments, the universal measurement identification system 106 can provide aggregated analytics task output 704 to the second digital content provider 102*b* so that the second digital content provider 102*b* can evaluate the effectiveness of placing advertisements for item 5466 on the first digital content provider system 102*a*.

By resolving the user identities between digital content provider systems, the universal measurement identification system 106 can accurately match user actions across multiple digital content provider systems without having to provide each digital content provider with private user data. Furthermore, by resolving the user identities, the matched user actions can perform aggregated analytics tasks with a higher reliability as shown in FIG. 7.

Figure 8:
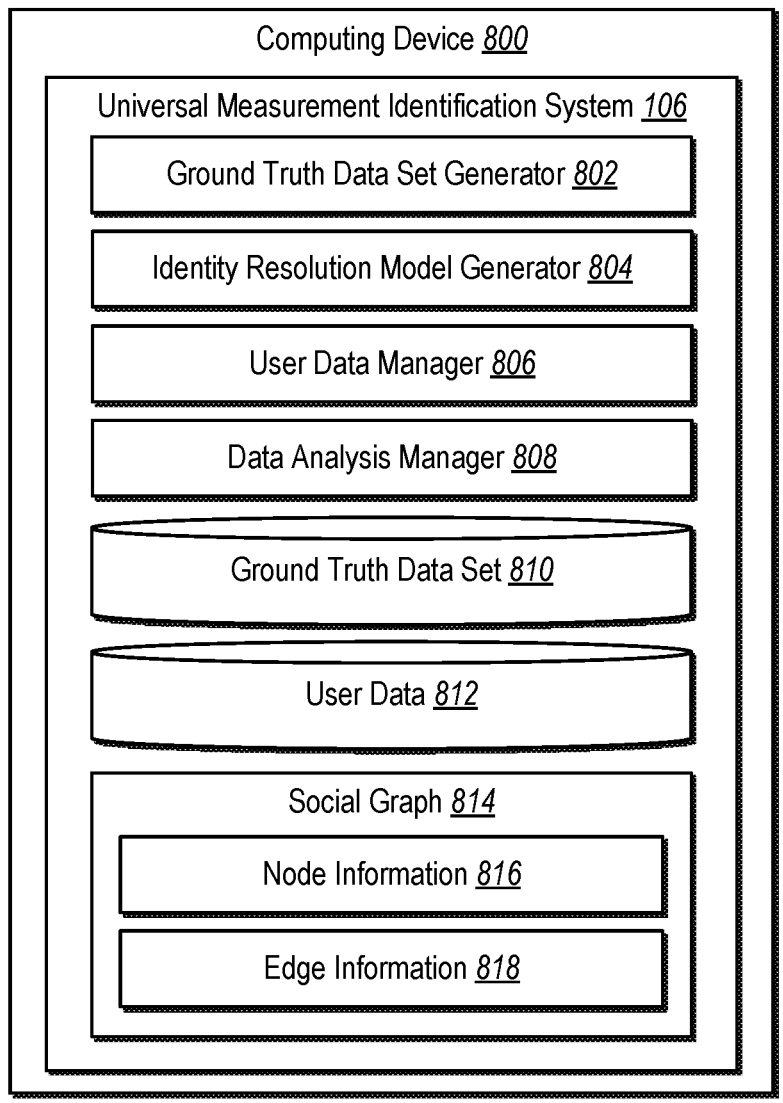
FIG. 8 illustrates an example schematic diagram of a universal measurement identification system in accordance with one or more embodiments.

Turning now to FIG. 8, additional detail will be provided regarding components and capabilities of the universal measurement identification system 106. Specifically, FIG. 8 illustrates an example schematic diagram of the universal measurement identification system 106 on an exemplary computing device 1100 (e.g., the server(s) 104, the network 112, and/or the digital content provider systems 102). As shown in FIG. 8, the universal measurement identification system 106 may include a ground truth data set generator 802, an identity resolution model generator 804, a user data manager 806, a data analysis manager 808, a ground truth data set 810, user data 812, and a social graph 814. While FIG. 8 depicts a particular number of components, in some embodiments, the universal measurement identification system 106 may include more or fewer components. In addition, the components may perform additional or alternative tasks than those described hereafter.

As mentioned, the universal measurement identification system 106 includes a ground truth data set generator 802. In particular, the ground truth data set generator 802 can collect, organize, identify, and utilize one or more data elements associated with one or more known users. For example, the ground truth data set generator 802 can collect data elements of known users and can utilize the collected data elements with one or more digital content providers 102 to evaluate the accuracy of predicted user identities from the digital content providers 102 and to generate an identity resolution model, as described above in FIGS. 1-7.

As also mentioned, the universal measurement identification system 106 includes an identity resolution model generator 804. In particular, the identity resolution model generator 804 can evaluate, generate, determine, and utilize one or more predicted user identities from one or more digital content providers 102 based on a ground truth data set. For example, the identity resolution model generator 804 can receive predicted user identities from one or more digital content providers 102 based on the data elements from a ground truth data set and evaluate the predicted user identities to assign a prediction accuracy score to the one or more digital content providers 102, as described above in FIGS. 1-7.

As also mentioned above, the universal measurement identification system 106 includes a user data manager 806. In particular, the user data manager 806 can collect, organize, identify, and utilize one or more data elements associated with one or more users from the one or more digital content provider systems 102. For example, the user data manager 806 can receive data elements of known and unknown users and can utilize the collected data elements to resolve user identities, as described above in FIGS. 1-7. More specifically, the user data manager 806 can provide the collected data elements to receive predicted user identities from the one or more digital content providers and utilize the predicted user identities with an identity resolution model to resolve the user identities, as described above in FIGS. 1-7. Furthermore, the user data manager 806 can also generate a universal identifier for the one or more user identities, as described above in FIGS. 1-7.

As also mentioned above, the universal measurement identification system 106 includes data analysis manager 808. In particular, the data analysis manager 808 can collect, organize, identify, utilize, analyze, and calculate one or more data elements and analytics data associated with one or more users from the one or more digital content provider systems 102. For example, the data analysis manager 808 can receive analytics data associated with users from the one or more digital content provider systems 102, as described above in FIGS. 1-7. Additionally, the data analysis manager 808 can utilize the analytics data, the resolved user identities, and the universal identifiers to perform aggregated analytics tasks to generate insights for the digital content provider systems 102, as described above in FIGS. 1-7.

As also mentioned above, the universal measurement identification system 106 further includes a ground truth data set 810. The ground truth data set 810 stores, maintains, and provides access to data elements of known users. Additionally, the universal measurement identification system 106 includes user data 812. User data 812 stores, maintains, and provides access to user data elements including profile information, demographic information, geographic information, analytics data, identity resolution model data, digital content provider data, or other information as described above in FIGS. 1-7.

The universal measurement identification system 106 further includes a social graph 814. The social graph 814 can include node information 816 and edge information 818. To elaborate, the social graph 814 can include node information 816 that stores information comprising nodes for users, nodes for concepts, and/or nodes for content items. In addition, the social graph 814 can include edge information 818 comprising relationships between nodes and/or actions occurring within the social-networking system. Further detail regarding social-networking systems, social graphs, edges, and nodes is presented below.

One or more of the above-mentioned components of the universal measurement identification system 106 can communicate with other components via an appropriate communications protocol. For example, the user data manager 806 can communicate with the data analysis manager 808 to perform aggregated analytics tasks for users associated to universal identifiers. Additionally, the user data manager 806 can communicate with the social graph 1112 to access user activity information and/or user profile information to store in user data 812 or the ground truth data set 810, and to use in determining identity resolution models and/or universal identifiers for the one or more users on the one or more digital content provider systems 102.

Figure 9:
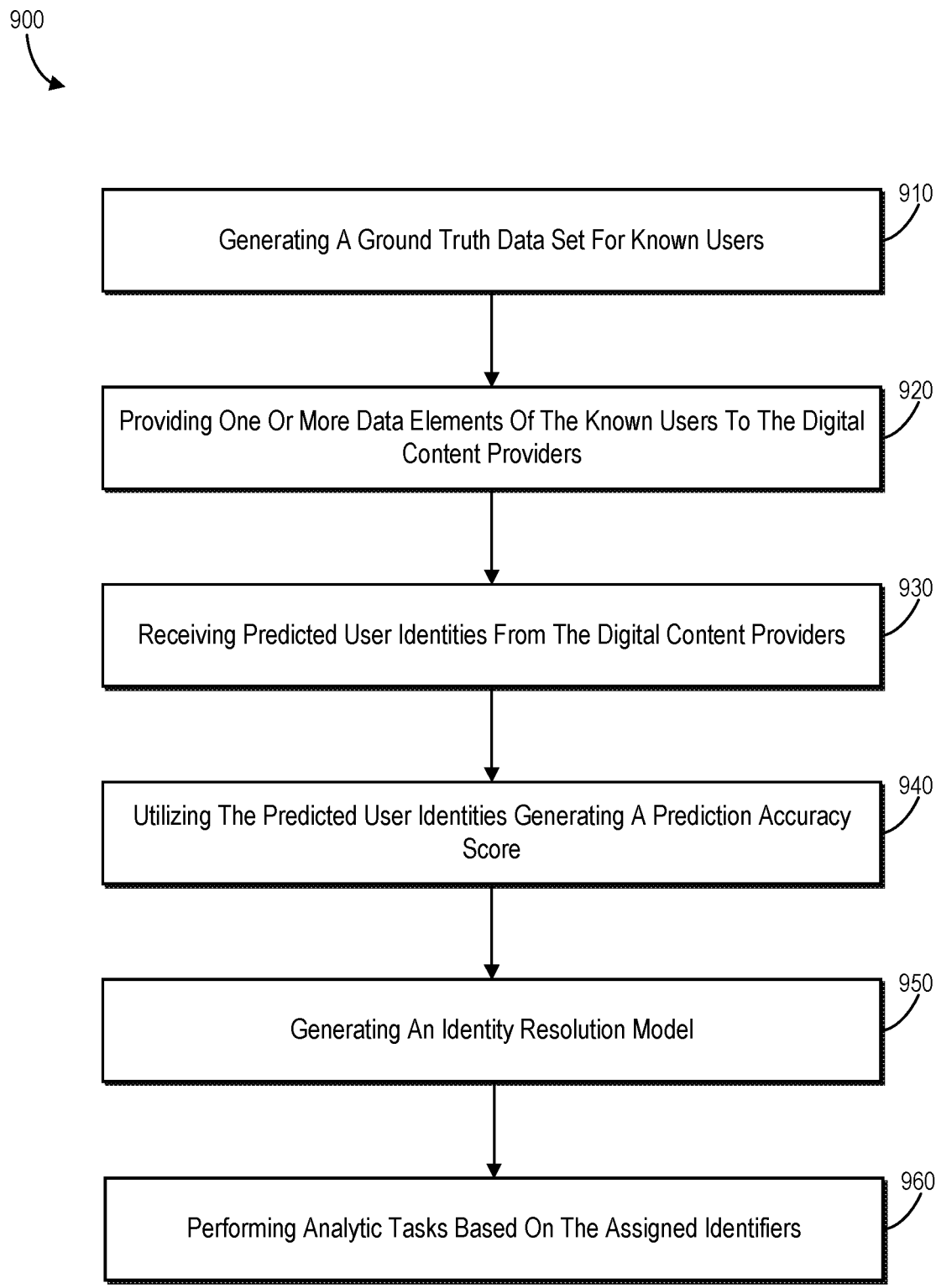
FIG. 9 illustrates a flowchart of a series of acts in a method of generating an identity resolution model based on a ground truth data set in accordance with one or more embodiments.

FIGS. 1-8, the corresponding text, and the examples provide a number of different systems and methods for utilizing a ground truth data set to generate an identity resolution model to resolve user identities between one or more digital content providers. In addition to the foregoing, embodiments can also be described in terms of flowcharts comprising acts steps in a method for accomplishing a particular result. For example, turning now to FIG. 9, this figure illustrates a flowchart of a series of acts 900 of utilizing a ground truth data set to generate an identity resolution model to resolve user identities between one or more digital content providers. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further embodiments, a system can perform the acts of FIG. 9.

As illustrated in FIG. 9, the series of acts 900 may include an act 910 of generating a ground truth data set for known users. In particular, the act 910 can include generating, by a universal management identification system comprising one or more server devices, a ground truth data set comprising, for each of a plurality of known users, one or more data elements. The one or more data elements can comprise of at least one of a browser cookie, an email address, a residential address, a phone number, an IP address, a device ID, and/or any other data collected from a user.

The series of acts 900 may further include an act 920 of providing one or more data elements of the known users to the digital content providers. In particular, the act 920 can include providing, to each of a plurality of providers, the one or more data elements of each of the plurality of known users.

As illustrated in FIG. 9, the series of acts 900 may still further include an act 930 of receiving predicted user identities from the digital content providers. In particular, the act 930 can include receiving, from each of the plurality of providers, predicted user identities for each of the plurality of known users based on the provided one or more data elements.

The series of acts 900 may further include an act 940 of utilizing the predicted user identities to generate a prediction accuracy score. In particular, the act 940 can include utilizing the predicted user identities from the plurality of providers to generate a prediction accuracy score for each of the plurality of providers. Additionally, the act 940 can include utilizing the predicted user identities from the plurality of providers to generate the prediction accuracy score for teach of the plurality of providers by determining a percentage of correctly predicted user identities for each of the plurality of providers as the prediction accuracy score. The act 940 can include utilizing the predicted user identities for each of the plurality of providers to generate a plurality of prediction accuracy scores for each of the plurality of providers based on a combination of one or more provided data elements of the plurality of known users. Additionally, the plurality of prediction accuracy scores for each of the plurality of providers can be specific to unique combinations of one or more provided data elements of the plurality of known users.

The series of acts 900 may further include an act 950 of generating an identity resolution model. In particular, the act

950 can include, based on the generated prediction accuracy scores for each of the plurality of providers, generating an identity resolution model to predict user identities for unknown users based on a predicted user identities received from the plurality of providers. Additionally, the act 950 can involve generating the identity resolution model based on the generated plurality of prediction accuracy scores for each of the plurality of providers. The act 950 can include generating the identity resolution model to predict the user identity based on the predicted user identities received from the plurality of providers by utilizing a machine learning model.

Additionally, the act 950 can include predicting user identities for unknown users based on predicted user identities received from the plurality of providers. In particular, the act 950 can include, sending one or more data elements for an unknown user to the plurality of providers. Additionally, the act 950 can include receiving predicted user identities for the unknown user from the plurality of providers in response to sending the one or more data elements for the unknown user to the plurality of providers. The act 950 can include utilizing the identity resolution model and the predicted user identities for the unknown user to determine the user identity for the unknown user. Additionally, the act 950 can include assigning an identifier to the unknown user.

The series of acts 900 may further include an act 960 of performing analytic tasks based on the assigned identifiers. In particular, the act 960 can include receiving analytics data for the determined user identity from the plurality of providers. Additionally, the act 960 can include utilizing the received analytics data from the plurality of providers to perform aggregated analytic tasks based on the assigned identifier. The act 960 can include storing the received analytics data for the assigned identifier in an intermediate data environment. Additionally, the act 960 can include utilizing an intermediate data environment wherein the intermediate data environment does not provide the one or more data elements of users of an independent provider to each of the plurality of providers.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
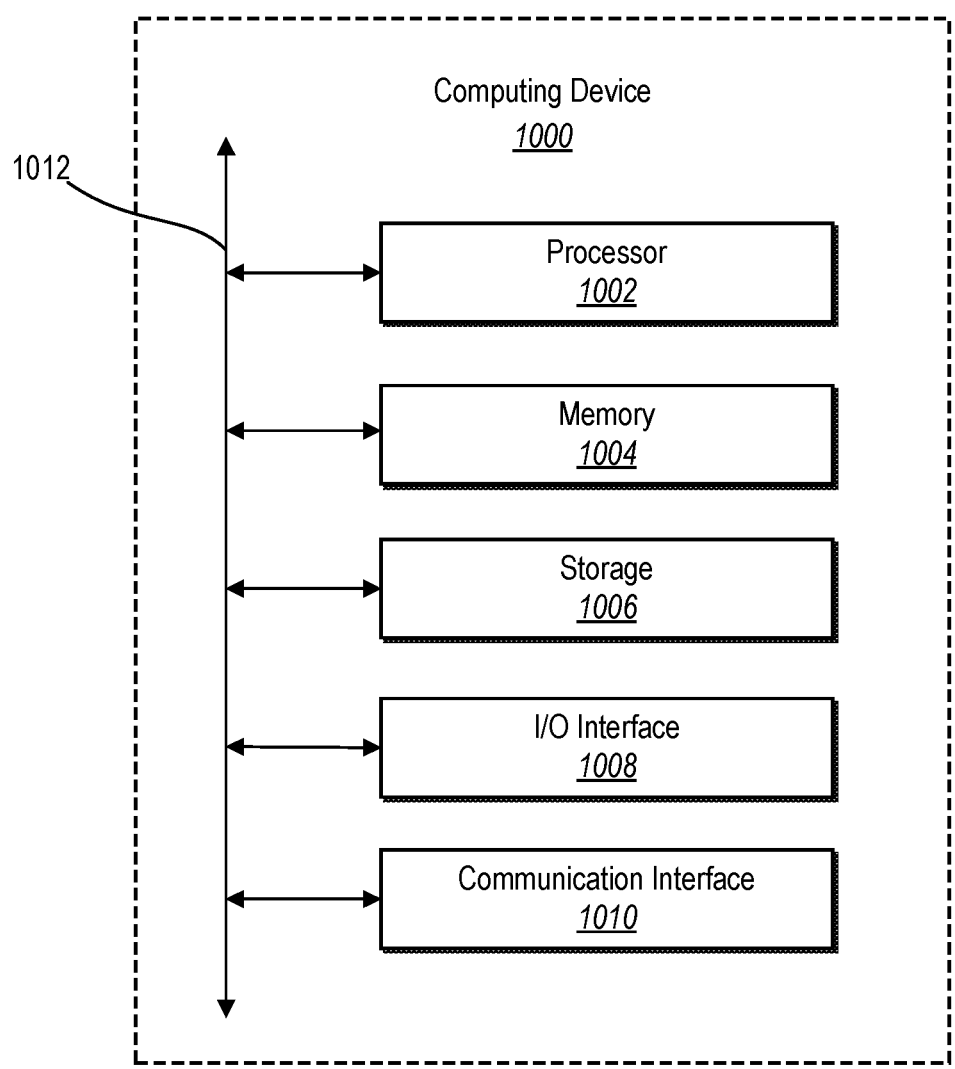
FIG. 10 illustrates a block diagram of an exemplary computing device in accordance with one or more embodiments.

FIG. 10 illustrates a block diagram of exemplary computing device 1000 that may be configured to perform one or more of the processes described above. One will appreciate that the computing device 1000 may represent one or more client devices or server devices, such as those described previously mentioned (e.g., computing device 1100). Further, the computing device 1000 may represent various types of computing devices. For example, the computing device 1000 can include: a mobile device such as a mobile telephone, a smartphone, a PDA, a tablet, a laptop; a non-mobile device such as a desktop or server; or any other type of computing device.

As shown in FIG. 10, the computing device 1000 can comprise a processor 1002, a memory 1004, a storage device 1006, an input/output ("I/O") interface 1008, and a communication interface 1010, which may be communicatively coupled by way of a communication infrastructure 1312. While an exemplary computing device 1000 is shown in FIG. 10, the components illustrated in FIG. 10 are not intended to be limiting. Additional or alternative components may be used in other embodiments. Furthermore, in certain embodiments, the computing device 1000 can include fewer components than those shown in FIG. 10.

In one or more embodiments, the processor 1002 includes hardware for executing instructions, such as those making up a computer program. The memory 1004 may be used for storing data, metadata, and programs for execution by the processor(s). The storage device 1006 includes storage for storing data or instructions.

The I/O interface 1008 allows a user (e.g., content producer or viewer) to provide input to, receive output from, and otherwise transfer data to and receive data from computing device 1000. The I/O interface 1008 may include a mouse, a keypad or a keyboard, a touchscreen, a camera, an optical scanner, network interface, modem, other known I/O devices or a combination of such I/O interfaces. The I/O interface 1008 may also include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example, the communication interface 1010 may include a network interface controller (NIC) or network adapter for communicating with an Ethernet or another wire-based network or a wireless NIC (WNIC) or wireless adapter for communicating with a wireless network, such as a WI-FI. The communication infrastructure 1312 may include hardware, software, or both that connects components of the computing device 1000 to each other. As an example, the communication infrastructure 1312 may include one or more types of buses.

As mentioned above, the communications system can be included in a social networking system. A social networking system may enable its users (such as persons or organizations) to interact with the system and with each other. The social networking system may, with input from a user, create and store in the social networking system a user profile associated with the user. As described above, the user profile may include demographic information, communication channel information, and information on personal interests of the user.

In more detail, user profile information may include, for example, biographic information, demographic information, behavioral information, the social information, or other types of descriptive information, such as work experience, educational history, hobbies or preferences, interests, affinities, or location. Interest information may include interests related to one or more categories, which may be general or specific. As an example, if a user "likes" an article about a brand of shoes, the category may be the brand.

The social networking system may also, with input from a user, create and store a record of relationships of the user with other users of the social networking system, as well as provide services (e.g. wall posts, photo-sharing, online calendars and event organization, messaging, games, or advertisements) to facilitate social interaction between or among users. Also, the social networking system may allow users to post photographs and other multimedia content items to a user's profile page (typically known as "wall posts" or "timeline posts") or in a photo album, both of which may be accessible to other users of the social networking system depending on the user's configured privacy settings. Herein, the term "friend" may refer to any other user of the social networking system with which a user has formed a connection, association, or relationship via the social networking system.

Figure 11:
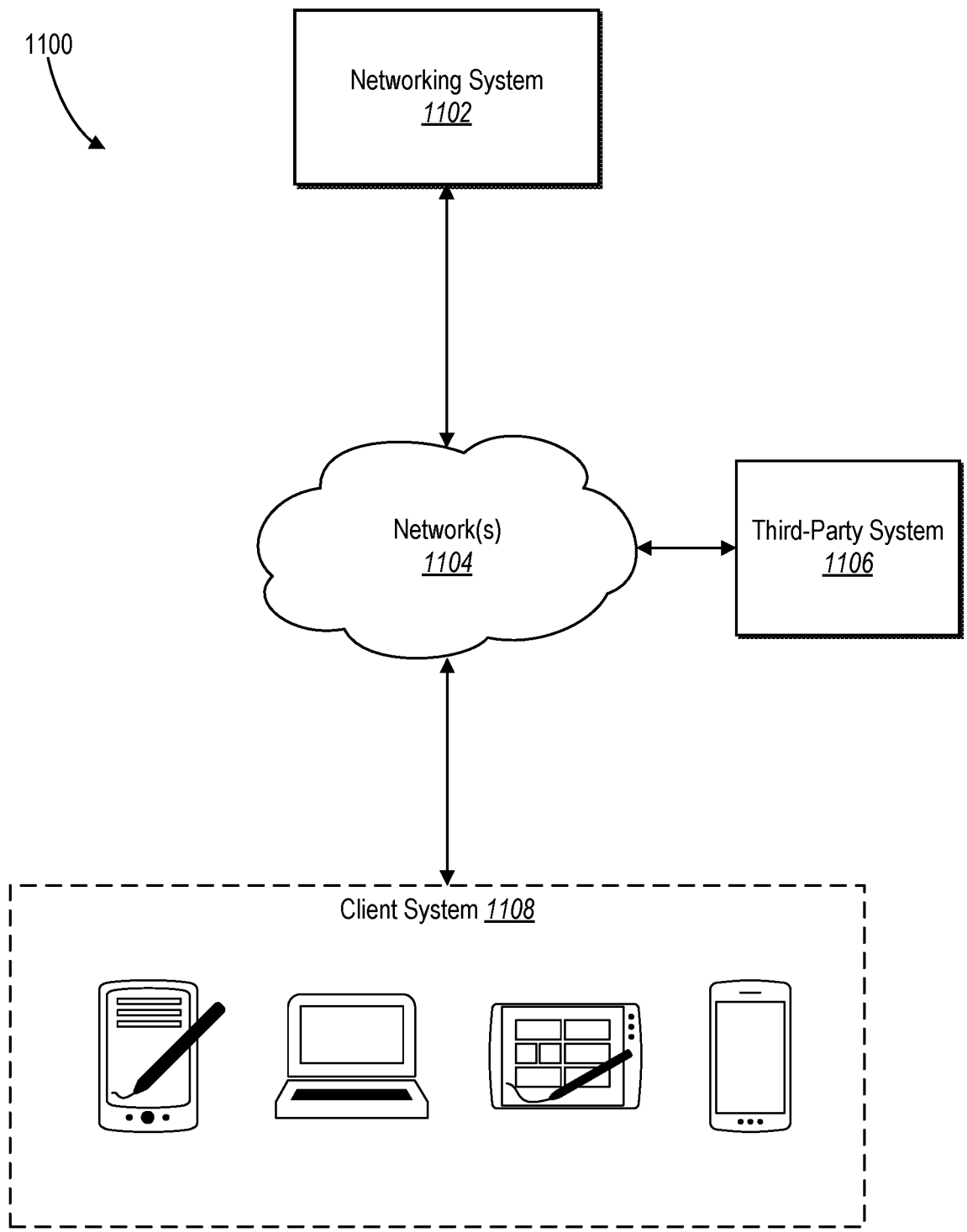
FIG. 11 illustrates an example environment of a networking system having the universal measurement identification system in accordance with one or more embodiments.

FIG. 11 illustrates an example network environment 1100 of a social networking system. Network environment 1100 includes a client device 1106, a networking system 1102 (e.g., a social networking system and/or an electronic messaging system), and a third-party system 1108 connected to each other by a network 1104. Although FIG. 11 illustrates a particular arrangement of client device 1106, networking system 1102, third-party system 1108, and network 1104, this disclosure contemplates any suitable arrangement of client device 1106, networking system 1102, third-party system 1108, and network 1104. As an example and not by way of limitation, two or more of client device 1106, networking system 1102, and third-party system 1108 may be connected to each other directly, bypassing network 1104. As another example, two or more of client device 1106, networking system 1102, and third-party system 1108 may be physically or logically co-located with each other in whole or in part. Moreover, although FIG. 11 illustrates a particular number of client devices 1106, networking systems 1102, third-party systems 1108, and networks 1104, this disclosure contemplates any suitable number of client devices 1106, networking systems 1102, third-party systems 1108, and networks 1104. As an example and not by way of limitation, network environment 1100 may include multiple client device 1106, networking systems 1102, third-party systems 1108, and networks 1104.

This disclosure contemplates any suitable network 1104. As an example and not by way of limitation, one or more portions of network 1104 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1104 may include one or more networks 1104.

Links may connect client device 1106, networking system 1102, and third-party system 1108 to communication network 1104 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1100. One or more first links may differ in one or more respects from one or more second links.

In particular embodiments, client device 1106 may be an electronic device including hardware, software, or embedded logic components or a combination of two or more such components and capable of carrying out the appropriate functionalities implemented or supported by client device 1106. As an example and not by way of limitation, a client device 1106 may include a computer system such as an augmented reality display device, a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client devices 1106. A client device 1106 may enable a network user at client device 1106 to access network 1104. A client device 1106 may enable its user to communicate with other users at other client devices 1106.

In particular embodiments, client device 1106 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 1106 may enter a Uniform Resource Locator (URL) or other address directing the web browser to a particular server (such as server, or a server associated with a third-party system 1108), and the web browser may generate a Hyper Text Transfer Protocol (HTTP) request and communicate the HTTP request to server. The server may accept the HTTP request and communicate to client device 1106 one or more Hyper Text Markup Language (HTML) files responsive to the HTTP request. Client device 1106 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, networking system 1102 may be a network-addressable computing system that can host an online social network. Networking system 1102 may generate, store, receive, and send social-networking data, such as, for example, user-profile data, concept-profile data, social-graph information, or other suitable data related to the online social network. Networking system 1102 may be accessed by the other components of network environment 1100 either directly or via network 1104. In particular embodiments, networking system 1102 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, networking system 1102 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1106, a networking system 1102, or a third-party system 1108 to manage, retrieve, modify, add, or delete, the information stored in data store.

In particular embodiments, networking system 1102 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Networking system 1102 may provide users of the online social network the ability to communicate and interact with other users. In particular embodiments, users may join the online social network via networking system 1102 and then add connections (e.g., relationships) to a number of other users of networking system 1102 that they want to be connected to. Herein, the term "friend" may refer to any other user of networking system 1102 with whom a user has formed a connection, association, or relationship via networking system 1102.

In particular embodiments, networking system 1102 may provide users with the ability to take actions on various types of items or objects, supported by networking system 1102. As an example and not by way of limitation, the items and objects may include groups or social networks to which users of networking system 1102 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in networking system 1102 or by an external system of third-party system 1108, which is separate from networking system 1102 and coupled to networking system 1102 via a network 1104.

In particular embodiments, networking system 1102 may be capable of linking a variety of entities. As an example and not by way of limitation, networking system 1102 may enable users to interact with each other as well as receive content from third-party systems 1108 or other entities, or to allow users to interact with these entities through an application programming interfaces (API) or other communication channels.

In particular embodiments, a third-party system 1108 may include one or more types of servers, one or more data stores, one or more interfaces, including but not limited to APIs, one or more web services, one or more content sources, one or more networks, or any other suitable components, e.g., that servers may communicate with. A third-party system 1108 may be operated by a different entity from an entity operating networking system 1102. In particular embodiments, however, networking system 1102 and third-party systems 1108 may operate in conjunction with each other to provide social-networking services to users of networking system 1102 or third-party systems 1108. In this sense, networking system 1102 may provide a platform, or backbone, which other systems, such as third-party systems 1108, may use to provide social-networking services and functionality to users across the Internet.

In particular embodiments, a third-party system 1108 may include a third-party content object provider. A third-party content object provider may include one or more sources of content objects, which may be communicated to a client device 1106. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, networking system 1102 also includes user-generated content objects, which may enhance a user's interactions with networking system 1102. User-generated content may include anything a user can add, upload, send, or "post" to networking system 1102. As an example and not by way of limitation, a user communicates posts to networking system 1102 from a client device 1106. Posts may include data such as status updates or other textual data, location information, photos, videos, links, music or other similar data or media. Content may also be added to networking system 1102 by a third-party through a "communication channel," such as a newsfeed or stream.

In particular embodiments, networking system 1102 may include a variety of servers, sub-systems, programs, modules, logs, and data stores. In particular embodiments, networking system 1102 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store.

Networking system 1102 may also include suitable components such as network interfaces, security mechanisms, load balancers, failover servers, management-and-network-operations consoles, other suitable components, or any suitable combination thereof. In particular embodiments, networking system 1102 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking networking system 1102 to one or more client devices 1106 or one or more third-party system 1108 via network 1104. The web server may include a mail server or other messaging functionality for receiving and routing messages between networking system 1102 and one or more client devices 1106. An API-request server may allow a third-party system 1108 to access information from networking system 1102 by calling one or more APIs. An action logger may be used to receive communications from a web server about a user's actions on or off networking system 1102. In conjunction with the action log, a third-party-content-object log may be maintained of user exposures to third-party-content objects. A notification controller may provide information regarding content objects to a client device 1106. Information may be pushed to a client device 1106 as notifications, or information may be pulled from client device 1106 responsive to a request received from client device 1106.

Authorization servers may be used to enforce one or more privacy settings of the users of networking system 1102. A privacy setting of a user determines how particular information associated with a user can be shared. The authorization server may allow users to opt in to or opt out of having their actions logged by networking system 1102 or shared with other systems (e.g., third-party system 1108), such as, for example, by setting appropriate privacy settings. Third-party-content-object stores may be used to store content objects received from third parties, such as a third-party system 1108. Location stores may be used for storing location information received from client devices 1106 associated with users. Advertisement-pricing modules may combine social information, the current time, location information, or other suitable information to provide relevant advertisements, in the form of notifications, to a user.

Figure 12:
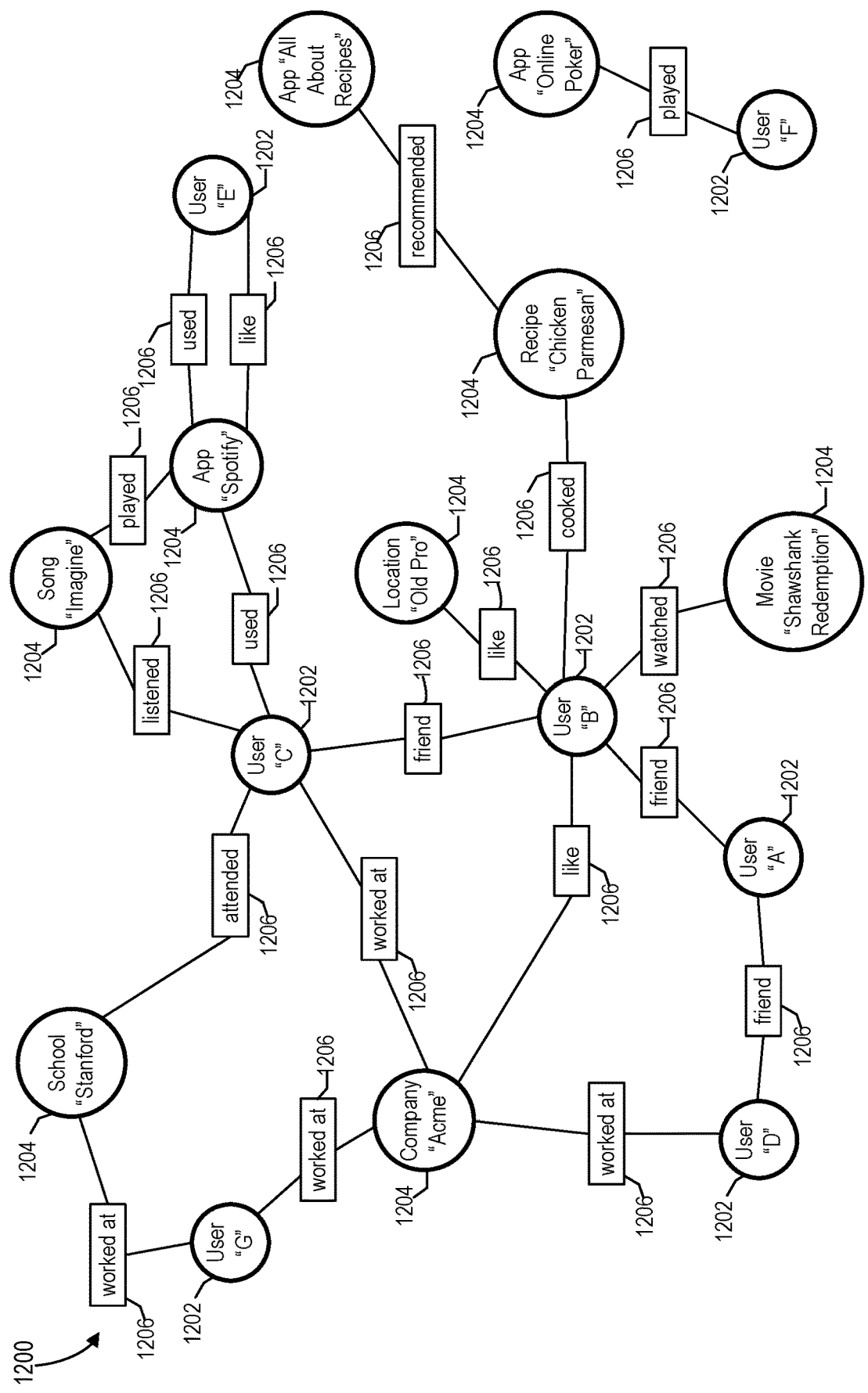
FIG. 12 illustrates an example social graph in accordance with one or more embodiments described herein.

FIG. 12 illustrates example social graph 1200. In particular embodiments, networking system 1102 may store one or more social graphs 1200 in one or more data stores. In particular embodiments, social graph 1200 may include multiple nodes—which may include multiple user nodes 1202 or multiple concept nodes 1204—and multiple edges 1206 connecting the nodes. Example social graph 1200 illustrated in FIG. 12 is shown, for didactic purposes, in a two-dimensional visual map representation. In particular embodiments, a networking system 1102, client device 1106, or third-party system 1108 may access social graph 1200 and related social-graph information for suitable applications. The nodes and edges of social graph 1200 may be stored as data objects, for example, in a data store (such as a social-graph database). Such a data store may include one or more searchable or query able indexes of nodes or edges of social graph 1200.

In particular embodiments, a user node 1202 may correspond to a user of networking system 1102. As an example and not by way of limitation, a user may be an individual (human user), an entity (e.g., an enterprise, business, or third-party application), or a group (e.g., of individuals or entities) that interacts or communicates with or over networking system 1102. In particular embodiments, when a user registers for an account with networking system 1102, networking system 1102 may create a user node 1202 corresponding to the user, and store the user node 1202 in one or more data stores. Users and user nodes 1202 described herein may, where appropriate, refer to registered users and user nodes 1202 associated with registered users. In addition or as an alternative, users and user nodes 1202 described herein may, where appropriate, refer to users that have not registered with networking system 1102. In particular embodiments, a user node 1202 may be associated with information provided by a user or information gathered by various systems, including networking system 1102. As an example and not by way of limitation, a user may provide his or her name, profile picture, contact information, birth date, sex, marital status, family status, employment, education background, preferences, interests, or other demographic information. In particular embodiments, a user node 1202 may be associated with one or more data objects corresponding to information associated with a user. In particular embodiments, a user node 1202 may correspond to one or more webpages.

In particular embodiments, a concept node 1204 may correspond to a concept. As an example and not by way of limitation, a concept may correspond to a place (such as, for example, a movie theater, restaurant, landmark, or city); a website (such as, for example, a website associated with networking system 1102 or a third-party website associated with a web-application server); an entity (such as, for example, a person, business, group, sports team, or celebrity); a resource (such as, for example, an audio file, video file, digital photo, text file, structured document, or application) which may be located within networking system 1102 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1204 may be associated with information of a concept provided by a user or information gathered by various systems, including networking system 1102. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1204 may be associated with one or more data objects corresponding to information associated with concept node 1204. In particular embodiments, a concept node 1204 may correspond to one or more webpages.

In particular embodiments, a node in social graph 1200 may represent or be represented by a webpage (which may be referred to as a "profile page"). Profile pages may be hosted by or accessible to networking system 1102. Profile pages may also be hosted on third-party websites associated with a third-party system 1108. As an example and not by way of limitation, a profile page corresponding to a particular external webpage may be the particular external webpage and the profile page may correspond to a particular concept node 1204. Profile pages may be viewable by all or a selected subset of other users. As an example and not by way of limitation, a user node 1202 may have a corresponding user-profile page in which the corresponding user may add content, make declarations, or otherwise express himself or herself. As another example and not by way of limitation, a concept node 1204 may have a corresponding concept-profile page in which one or more users may add content, make declarations, or express themselves, particularly in relation to the concept corresponding to concept node 1204.

In particular embodiments, a concept node 1204 may represent a third-party webpage or resource hosted by a third-party system 1108. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 1106 to send to networking system 1102 a message indicating the user's action. In response to the message, networking system 1102 may create an edge (e.g., an "eat" edge) between a user node 1202 corresponding to the user and a concept node 1204 corresponding to the third-party webpage or resource and store edge 1206 in one or more data stores.

In particular embodiments, a pair of nodes in social graph 1200 may be connected to each other by one or more edges 1206. An edge 1206 connecting a pair of nodes may represent a relationship between the pair of nodes. In particular embodiments, an edge 1206 may include or represent one or more data objects or attributes corresponding to the relationship between a pair of nodes. As an example and not by way of limitation, a first user may indicate that a second user is a "friend" of the first user. In response to this indication, networking system 1102 may send a "friend request" to the second user. If the second user confirms the "friend request," networking system 1102 may create an edge 1206 connecting the first user's user node 1202 to the second user's user node 1202 in social graph 1200 and store edge 1206 as social-graph information in one or more of data stores. In the example of FIG. 12, social graph 1200 includes an edge 1206 indicating a friend relation between user nodes 1202 of user "A" and user "B" and an edge indicating a friend relation between user nodes 1202 of user "C" and user "B." Although this disclosure describes or illustrates particular edges 1206 with particular attributes connecting particular user nodes 1202, this disclosure contemplates any suitable edges 1206 with any suitable attributes connecting user nodes 1202. As an example and not by way of limitation, an edge 1206 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1200 by one or more edges 1206.

In particular embodiments, an edge 1206 between a user node 1202 and a concept node 1204 may represent a particular action or activity performed by a user associated with user node 1202 toward a concept associated with a concept node 1204. As an example and not by way of limitation, as illustrated in FIG. 12, a user may "like," "attended," "played," "listened," "cooked," "worked at," or "watched" a concept, each of which may correspond to an edge type or subtype. A concept-profile page corresponding to a concept node 1204 may include, for example, a selectable "check in" icon (such as, for example, a clickable "check in" icon) or a selectable "add to favorites" icon. Similarly, after a user clicks these icons, networking system 1102 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, networking system 1102 may create a "listened" edge 1206 and a "used" edge (as illustrated in FIG. 12) between user nodes 1202 corresponding to the user and concept nodes 1204 corresponding to the song and application to indicate that the user listened to the song and used the application. Moreover, networking system 1102 may create a "played" edge 1206 (as illustrated in FIG. 12) between concept nodes 1204 corresponding to the song and the application to indicate that the particular song was played by the particular application. In this case, "played" edge 1206 corresponds to an action performed by an external application (SPOTIFY) on an external audio file (the song "Imagine"). Although this disclosure describes particular edges 1206 with particular attributes connecting user nodes 1202 and concept nodes 1204, this disclosure contemplates any suitable edges 1206 with any suitable attributes connecting user nodes 1202 and concept nodes 1204. Moreover, although this disclosure describes edges between a user node 1202 and a concept node 1204 representing a single relationship, this disclosure contemplates edges between a user node 1202 and a concept node 1204 representing one or more relationships. As an example and not by way of limitation, an edge 1206 may represent both that a user likes and has used at a particular concept. Alternatively, another edge 1206 may represent each type of relationship (or multiples of a single relationship) between a user node 1202 and a concept node 1204 (as illustrated in FIG. 12 between user node 1202 for user "E" and concept node 1204 for "SPOTIFY").

In particular embodiments, networking system 1102 may create an edge 1206 between a user node 1202 and a concept node 1204 in social graph 1200. As an example and not by way of limitation, a user viewing a concept-profile page (such as, for example, by using a web browser or a special-purpose application hosted by the user's client device 1106) may indicate that he or she likes the concept represented by the concept node 1204 by clicking or selecting a "Like" icon, which may cause the user's client device 1106 to send to networking system 1102 a message indicating the user's liking of the concept associated with the concept-profile page. In response to the message, networking system 1102 may create an edge 1206 between user node 1202 associated with the user and concept node 1204, as illustrated by "like" edge 1206 between the user and concept node 1204. In particular embodiments, networking system 1102 may store an edge 1206 in one or more data stores. In particular embodiments, an edge 1206 may be automatically formed by networking system 1102 in response to a particular user action. As an example and not by way of limitation, if a first user uploads a picture, watches a movie, or listens to a song, an edge 1206 may be formed between user node 1202 corresponding to the first user and concept nodes 1204 corresponding to those concepts. Although this disclosure describes forming particular edges 1206 in particular manners, this disclosure contemplates forming any suitable edges 1206 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on networking system 1102). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, networking system 1102 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through networking system 1102) or RSVP (e.g., through networking system 1102) to an event associated with the advertisement. In addition or as an alternative, an advertisement may include social-networking-system context directed to the user. As an example and not by way of limitation, an advertisement may display information about a friend of the user within networking system 1102 who has taken an action associated with the subject matter of the advertisement.

In particular embodiments, networking system 1102 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1108 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, networking system 1102 may measure or quantify social-graph affinity using an affinity coefficient (which may be referred to herein as "coefficient") . The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, networking system 1102 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the networking system 1102 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, networking system 1102 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, networking system 1102 may calculate a coefficient based on a user's actions. Networking system 1102 may monitor such actions on the online social network, on a third-party system 1108, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, networking system 1102 may calculate a coefficient based on the user's actions with particular types of content. The content may be associated with the online social network, a third-party system 1108, or another suitable system. The content may include users, profile pages, posts, news stories, headlines, instant messages, chat room conversations, emails, advertisements, pictures, video, music, other suitable objects, or any combination thereof. Networking system 1102 may analyze a user's actions to determine whether one or more of the actions indicate an affinity for subject matter, content, other users, and so forth. As an example and not by way of limitation, if a user may make frequently posts content related to "coffee" or variants thereof, networking system 1102 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, networking system 1102 may calculate a coefficient based on the type of relationship between particular objects. Referencing the social graph 1200, networking system 1102 may analyze the number and/or type of edges 1206 connecting particular user nodes 1202 and concept nodes 1204 when calculating a coefficient. As an example and not by way of limitation, user nodes 1202 that are connected by a spouse-type edge (representing that the two users are married) may be assigned a higher coefficient than a user node 1202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, networking system 1102 may determine that the user has a higher coefficient with respect to the first photo than the second photo because having a tagged-in-type relationship with content may be assigned a higher weight and/or rating than having a like-type relationship with content. In particular embodiments, networking system 1102 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, networking system 1102 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 1200. As an example and not by way of limitation, social-graph entities that are closer in the social graph 1200 (i.e., fewer degrees of separation) may have a higher coefficient than entities that are further apart in the social graph 1200.

In particular embodiments, networking system 1102 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device 1106 of the user). A first user may be more interested in other users or concepts that are closer to the first user. As an example and not by way of limitation, if a user is one mile from an airport and two miles from a gas station, networking system 1102 may determine that the user has a higher coefficient for the airport than the gas station based on the proximity of the airport to the user.

In particular embodiments, networking system 1102 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, networking system 1102 may provide information that is relevant to user's interests and current circumstances, increasing the likelihood that they will find such information of interest. In particular embodiments, networking system 1102 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, networking system 1102 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, networking system 1102 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1108 (e.g., via an API or other communication channel), or from another suitable system. In response to the request, networking system 1102 may calculate the coefficient (or access the coefficient information if it has previously been calculated and stored). In particular embodiments, networking system 1102 may measure an affinity with respect to a particular process. Different processes (both internal and external to the online social network) may request a coefficient for a particular object or set of objects. Networking system 1102 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/971,1027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1204 corresponding to a particular photo may have a privacy setting specifying that the photo may only be accessed by users tagged in the photo and their friends. In particular embodiments, privacy settings may allow users to opt in or opt out of having their actions logged by networking system 1102 or shared with other systems (e.g., third-party system 1108). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 1108, particular applications (e.g., third-party applications, external web-sites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, networking system 1102 may send a request to the data store for the object. The request may identify the user associated with the request and may only be sent to the user (or a client device 1106 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
    generating, by a universal measurement identification system comprising one or more server devices, a ground truth data set comprising, for each of a plurality of known users, one or more data elements that correspond to user identification information or actions of each of the plurality of known users;
    providing, to each of a plurality of digital content providers, the one or more data elements of each of the plurality of known users from the ground truth data set;
    receiving, from each of the plurality of digital content providers, predicted user identities for each of the plurality of known users based on the provided one or more data elements;
    generating a prediction accuracy score for each of the plurality of digital content providers by comparing the predicted user identities from the plurality of digital content providers to the ground truth data set; and based on the generated prediction accuracy scores for each of the plurality of digital content providers, generating an identity resolution model to predict user identities for unknown users based on predicted user identities received from the plurality of digital content providers.

2. The method of claim 1, further comprising:

sending one or more data elements for an unknown user to the plurality of digital content providers;

receiving predicted user identities for the unknown user from the plurality of digital content providers in response to sending the one or more data elements for the unknown user to the plurality of digital content providers;

utilizing the identity resolution model and the predicted user identities for the unknown user to determine a user identity for the unknown user; and assigning an identifier to the user identity for the unknown user.

3. The method of claim 1, wherein utilizing the predicted user identities from the plurality of digital content providers to generate the prediction accuracy score for each of the plurality of digital content providers further comprises determining a percentage of correctly predicted user identities for each of the plurality of digital content providers as the prediction accuracy score.

4. The method of claim 1, wherein the one or more data elements comprise of at least one of a browser cookie, an email address, a residential address, a phone number, an IP address, or a device ID.

5. The method of claim 1, further comprising:

utilizing the predicted user identities for each of the plurality of digital content providers to generate a plurality of prediction accuracy scores for each of the plurality of digital content providers based on a combination of one or more provided data elements of the plurality of known users; and generating the identity resolution model based on the generated plurality of prediction accuracy scores for each of the plurality of digital content providers.

6. The method of claim 1, wherein generating the identity resolution model to predict a user identity based on the predicted user identities received from the plurality of digital content providers further comprises utilizing a machine learning model.

7. The method of claim 2, further comprising:

receiving analytics data for the determined user identity from the plurality of digital content providers; and utilizing the received analytics data from the plurality of digital content providers to perform aggregated analytic tasks based on the assigned identifier.

8. The method of claim 5, wherein the plurality of prediction accuracy scores for each of the plurality of digital content providers are specific to unique combinations of one or more provided data elements of the plurality of known users.

9. The method of claim 7, further comprising storing the received analytics data for the assigned identifier in an intermediate data environment, wherein the intermediate data environment does not provide data elements of users of an independent digital content provider to each of the plurality of digital content providers.

10. A system comprising:

at least one processor; and at least one non-transitory computer-readable storage medium storing instructions that, when executed by the at least one processor, cause the system to:

generate, by a universal measurement identification system comprising one or more server devices, a ground truth data set comprising, for each of a plurality of known users, one or more data elements that correspond to user identification information or actions of each of the plurality of known users;

provide, to each of a plurality of digital content providers, the one or more data elements of the plurality of known users from the ground truth data set;

receive, from each of the plurality of digital content providers, predicted user identities for each of the plurality of known users based on the provided one or more data elements;

generate a prediction accuracy score for each of the plurality of digital content providers by comparing the predicted user identities from the plurality of digital content providers to the ground truth data set; and based on the generated prediction accuracy scores for each of the plurality of digital content providers, generate an identity resolution model to predict user identities for unknown users based on predicted user identities received from the plurality of digital content providers.

11. The system of claim 10, further comprising instructions that, when executed by the at least one processor, cause the system to:

send one or more data elements for an unknown user to the plurality of digital content providers;

receive predicted user identities for the unknown user from the plurality of digital content providers in response to sending the one or more data elements for the unknown user to the plurality of digital content providers;

utilize the identity resolution model and the predicted user identities for the unknown user to determine a user identity for the unknown user; and assign an identifier to the user identity for the unknown user.

12. The system of claim 10, wherein utilizing the predicted user identities from the plurality of digital content providers to generate the prediction accuracy score for each of the plurality of digital content providers further comprises determining a percentage of correctly predicted user identities for each of the plurality of digital content providers as the prediction accuracy score.

13. The system of claim 10, further comprising instructions that, when executed by the at least one processor, cause the system to:

utilize the predicted user identities for each of the plurality of digital content providers to generate a plurality of prediction accuracy scores for each of the plurality of digital content providers based on a combination of one or more provided data elements of the plurality of known users; and generate the identity resolution model based on the generated plurality of prediction accuracy scores for each of the plurality of digital content providers.

14. The system of claim 11, further comprising instructions that, when executed by the at least one processor, cause the system to:

receive analytics data for the determined user identity from the plurality of digital content providers; and utilize the received analytics data from the plurality of digital content providers to perform aggregated analytic tasks based on the assigned identifier.

15. A non-transitory computer readable medium storing instructions thereon that, when executed by at least one processor, cause a computer device to:
  generate, by a universal measurement identification system comprising one or more server devices, a ground truth data set comprising, for each of a plurality of known users, one or more data elements that correspond to user identification information or actions of each of the plurality of known users;
  provide, to each of a plurality of digital content providers, the one or more data elements of each of the plurality of known users from the ground truth data set;
  receive, from each of the plurality of digital content providers, predicted user identities for each of the plurality of known users based on the provided one or more data elements;
  generate a prediction accuracy score for each of the plurality of digital content providers by comparing the predicted user identities from the plurality of digital content providers to the ground truth data set; and
  based on the generated prediction accuracy scores for each of the plurality of digital content providers, generate an identity resolution model to predict user identities for unknown users based on predicted user identities received from the plurality of digital content providers.

16. The non-transitory computer readable medium of claim 15, further comprising instructions that, when executed by at least one processor, cause the computer to:
  send one or more data elements for an unknown user to the plurality of digital content providers;
  receive predicted user identities for the unknown user from the plurality of digital content providers in response to sending the one or more data elements for the unknown user to the plurality of digital content providers;
  utilize the identity resolution model and the predicted user identities for the unknown user to determine a user identity for the unknown user; and
  assign an identifier to the user identity for the unknown user.

17. The non-transitory computer readable medium of claim 15, wherein utilizing the predicted user identities from the plurality of digital content providers to generate the prediction accuracy score for each of the plurality of digital content providers further comprises determining a percentage of correctly predicted user identities for each of the plurality of digital content providers as the prediction accuracy score.

18. The non-transitory computer readable medium of claim 15, wherein the one or more data elements comprise of at least one of a browser cookie, an email address, a residential address, a phone number, an IP address, or a device ID.

19. The non-transitory computer readable medium of claim 15, further comprising instructions that, when executed by at least one processor, cause the computer to:
  utilize the predicted user identities for each of the plurality of digital content providers to generate a plurality of prediction accuracy scores for each of the plurality of digital content providers based on a combination of one or more provided data elements of the plurality of known users; and
  generating the identity resolution model based on the generated plurality of prediction accuracy scores for each of the plurality of digital content providers.

20. The non-transitory computer readable medium of claim 16, further comprising instructions that, when executed by at least one processor, cause the computer to:
  receive analytics data for the determined user identity from the plurality of digital content providers; and
  utilize the received analytics data from the plurality of digital content providers to perform aggregated analytic tasks based on the assigned identifier.

* * * * *